(12) United States Patent
Heo

(10) Patent No.: US 10,678,396 B2
(45) Date of Patent: Jun. 9, 2020

(54) IMAGE DISPLAY DEVICE AND METHOD FOR CONTROLLING THE SAME

(71) Applicant: LG Electronics Inc., Seoul (KR)

(72) Inventor: Seunghyun Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 502 days.

(21) Appl. No.: 15/152,128

(22) Filed: May 11, 2016

(65) Prior Publication Data

US 2016/0334963 A1    Nov. 17, 2016

(30) Foreign Application Priority Data

May 12, 2015    (KR) ........................ 10-2015-0066223

(51) Int. Cl.
  *G06F 3/0481*    (2013.01)
  *H04N 21/431*    (2011.01)
  *G06F 3/0482*    (2013.01)

(52) U.S. Cl.
  CPC ........ G06F 3/04812 (2013.01); G06F 3/0482 (2013.01); G06F 3/04817 (2013.01); *H04N 21/4316* (2013.01)

(58) Field of Classification Search
  None
  See application file for complete search history.

(56) References Cited

U.S. PATENT DOCUMENTS

| 5,596,347 | A  | * | 1/1997 | Robertson | G06F 3/04812 |
| | | | | | 345/157 |
| 5,648,781 | A | | 7/1997 | Choi | |
| 5,673,087 | A | * | 9/1997 | Choi | G06F 3/033 |
| | | | | | 345/157 |
| 6,175,840 | B1 | | 1/2001 | Chen et al. | |
| 6,640,337 | B1 | * | 10/2003 | Lu | G06F 3/033 |
| | | | | | 348/734 |
| 8,819,004 | B1 | * | 8/2014 | Petcherski | G06F 17/30 |
| | | | | | 707/727 |
| 2002/0122027 | A1 | * | 9/2002 | Kim | G06F 3/04812 |
| | | | | | 345/167 |
| 2004/0165013 | A1 | | 8/2004 | Nelson et al. | |
| 2008/0225007 | A1 | * | 9/2008 | Nakadaira | G06F 3/03545 |
| | | | | | 345/173 |
| 2011/0078733 | A1 | | 3/2011 | Lee | |
| 2012/0060092 | A1 | | 3/2012 | Hill et al. | |
| 2012/0062457 | A1 | * | 3/2012 | Lee | G06F 3/0346 |
| | | | | | 345/157 |

(Continued)

FOREIGN PATENT DOCUMENTS

| EP | 0665489 A2 | 8/1995 |
| KR | 10-2012-0131294 A | 12/2012 |
| WO | WO 2007/109480 A2 | 9/2007 |

*Primary Examiner* — Beau D Spratt
(74) *Attorney, Agent, or Firm* — Birch, Stewart, Kolasch & Birch, LLP

(57) ABSTRACT

The present disclosure relates to an image display device for displaying a pointer and a control method thereof. An image display device according to the present disclosure may include a display unit configured to display image information, and a controller configured to display a pointer at a position set on the basis of a region displayed with a first layer based on the first layer displayed as an upper layer in a state that the image information is displayed thereon.

13 Claims, 21 Drawing Sheets

(56) References Cited

U.S. PATENT DOCUMENTS

| | | | |
|---|---|---|---|
| 2012/0166989 A1 | 6/2012 | Brown et al. | |
| 2012/0185905 A1* | 7/2012 | Kelley | H04N 9/75 725/109 |
| 2013/0091457 A1 | 4/2013 | Ferri et al. | |
| 2014/0344731 A1* | 11/2014 | Holz | G06F 3/04812 715/764 |
| 2014/0359522 A1* | 12/2014 | Kim | G06F 3/0482 715/781 |
| 2015/0193036 A1* | 7/2015 | Yoo | G06F 3/017 345/173 |
| 2015/0326925 A1* | 11/2015 | Ozkan | H04N 21/466 725/36 |
| 2016/0004411 A1* | 1/2016 | John Archibald | G06F 3/04812 345/159 |
| 2018/0088676 A1* | 3/2018 | Ach | G06F 3/011 |

* cited by examiner

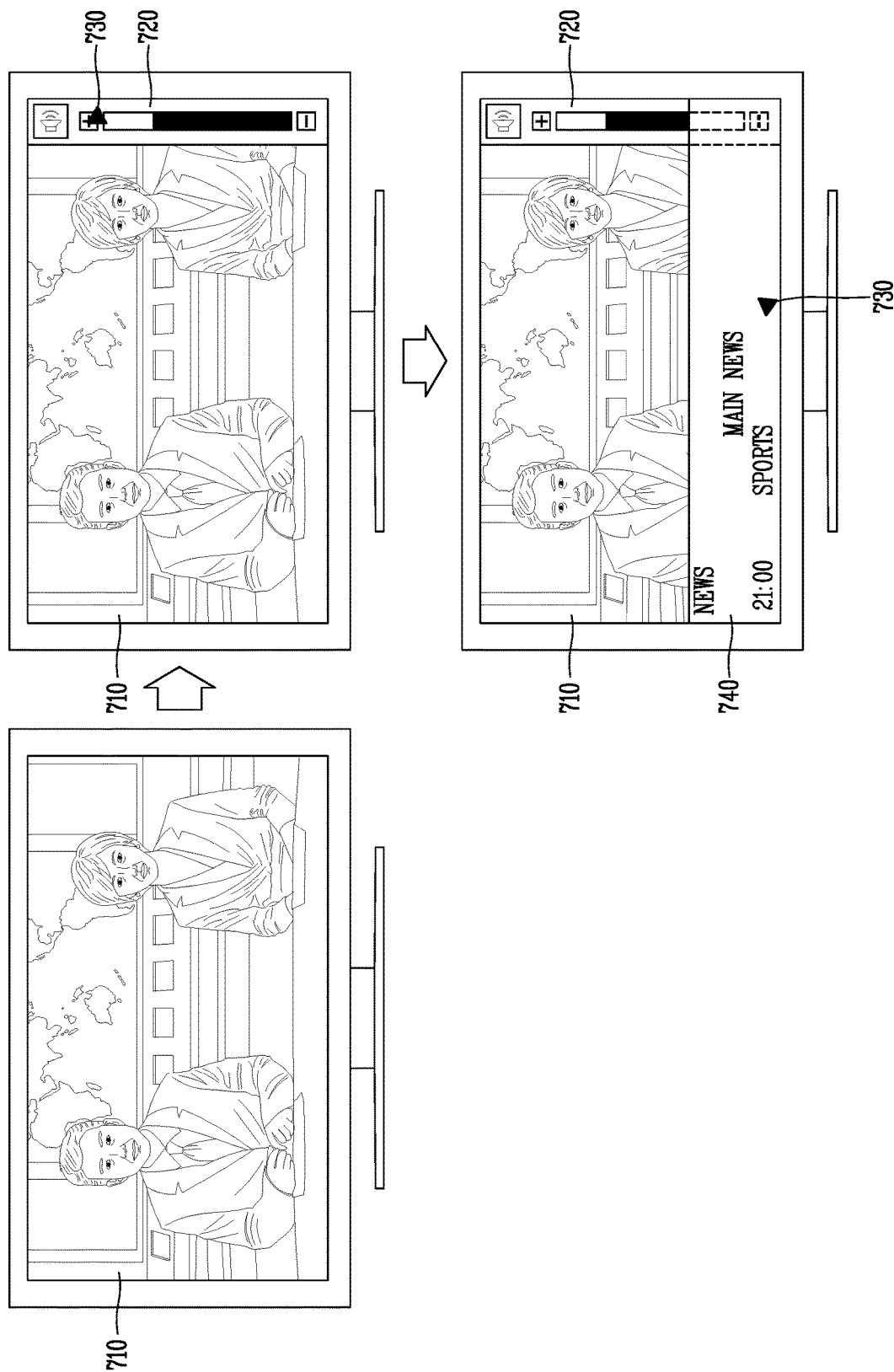

FIG. 11A
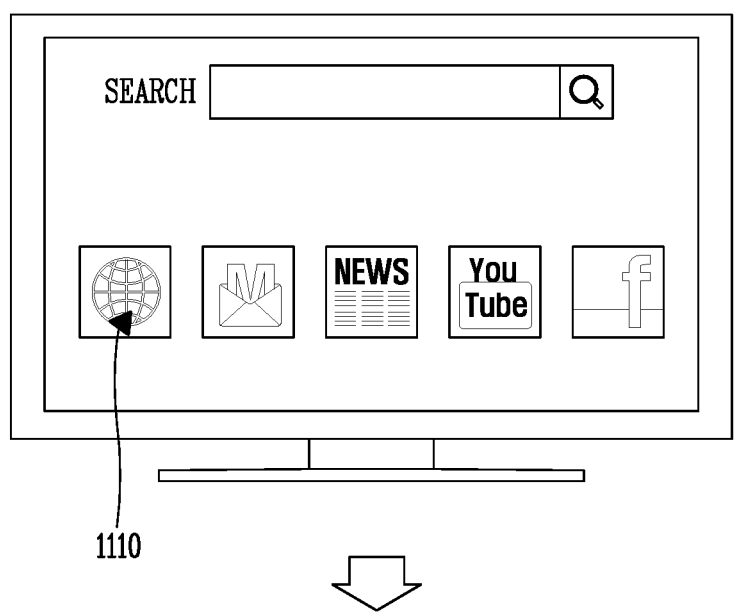
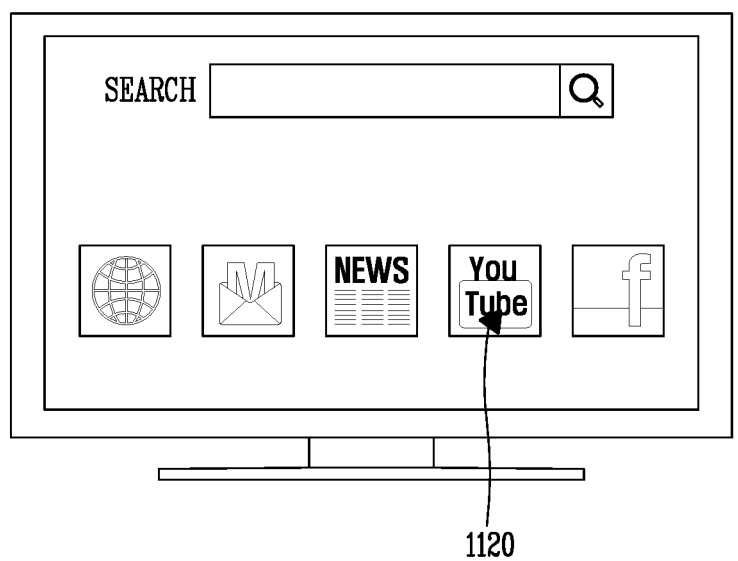

FIG. 11B
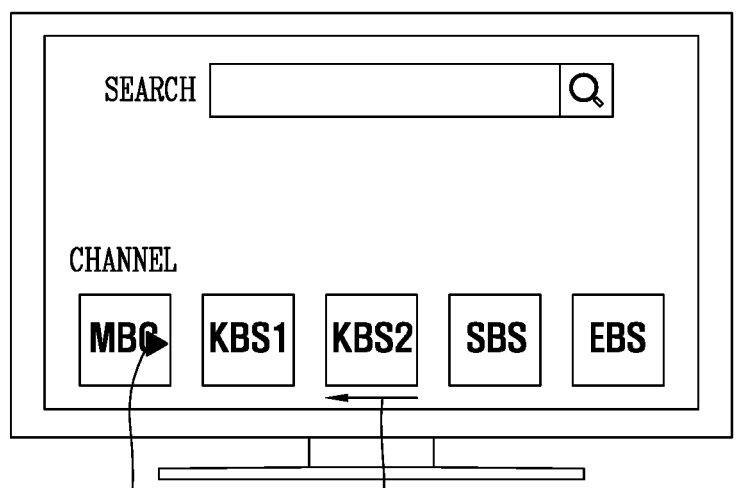
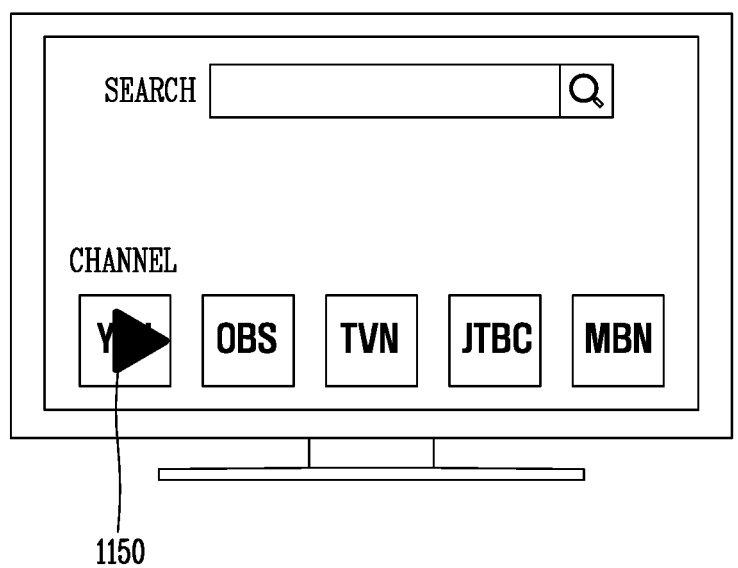

1220  1210

1240

IMAGE DISPLAY DEVICE AND METHOD FOR CONTROLLING THE SAME

CROSS-REFERENCE TO RELATED APPLICATION

This application claims the benefit of priority of Korean Patent Application No. 10-2015-0066223, filed on May 12, 2015, which is herein expressly incorporated by reference in their entireties.

BACKGROUND OF THE INVENTION

1. Field of the Invention

The present disclosure relates to an image display device for displaying a pointer and a control method thereof.

2. Description of the Related Art

An image display device may include all devices for receiving and displaying broadcasts, recording and playing video back, and recording and playing audio back. The image display device may include a television, a smart TV, a monitor, a projector, a tablet, and the like.

As functions thereof become diversified, the image display device is implemented in the form of a multimedia player having complicated functions such as capturing still or moving images, gaming, receiving broadcasts, and the like in addition to a function of outputting broadcasts or playing video.

Various new attempts have been made in the aspect of hardware or software in order to support and enhance such functions of the image display device.

On the other hand, a pointer that is an indicator showing a position to which a user input can be applied may be displayed on the image display device such as a television, a smart TV, or the like. Various methods have been proposed in connection with an initial position setting of such a pointer.

SUMMARY OF THE INVENTION

An object of the present disclosure is to solve the foregoing problems and other problems. Another object of the present disclosure is to provide an image display device and a control method thereof capable of setting the position of a pointer in consideration of a newly displayed layer.

In order to accomplish the foregoing and other objects, according to an aspect of the present disclosure, there is provided an image display device including a display unit configured to display image information, and a controller configured to display a pointer at a position set on the basis of a region displayed with a first layer based on the first layer displayed as an upper layer in a state that the image information is displayed thereon.

According to an embodiment, the controller may display the pointer at a preset point of the region displayed with the first layer based on the first layer displayed as an upper layer.

Specifically, the controller may display the pointer at a center point of the region displayed with the first layer.

According to another embodiment, the controller may display the pointer in a region displayed with a preset object within the region displayed with the first layer based on the first layer displayed as an upper layer.

According to still another embodiment, the controller may display the pointer at a position selected on the basis of history information to which the position of the pointer has been set by a user input based on the first layer displayed as an upper layer.

Specifically, the controller may display the pointer at any position based on history information to which the position of the pointer has been set above a preset number of times at the any position by a user input based on the first layer displayed as an upper layer.

According to yet still another embodiment, the controller may display the pointer in a region displayed with a preset object in response to image information being displayed on the display unit based on the first layer displayed as an upper layer.

According to still yet another embodiment, the controller may display the pointer in a region displayed with a preset layer among a plurality of layers based on the plurality of layers concurrently or sequentially displayed in a state that the image information is displayed on the display unit.

Specifically, the controller may display the pointer in a region displayed with a topmost layer among the plurality of layers.

According to yet still another embodiment, the controller may display the pointer in a region displayed with a preset content among a plurality of contents based on the plurality of contents displayed on the display unit.

Specifically, the controller may display the pointer in a region allowed for a user input.

Furthermore, the controller may display the pointer on a pause or stop icon for a video content when the video content is being played back, and display the pointer on a playback icon for the video content when the video content is in a pause or stop state.

According to still yet another embodiment, the controller may display the pointer in a region displayed with a content that has been selected above a preset number of time by a user among the plurality of contents.

Specifically, the controller may move the pointer to a region displayed with a second content that has been selected above a preset number of times by the user among the plurality of contents based on a user input for searching the plurality of contents that is applied thereto in a state that that the pointer is displayed in a region displayed with a first content.

Furthermore, according to another aspect of the present disclosure, there is provided a control method of an image display device, including (a) displaying image information on a display unit, and (b) displaying a pointer at a position set on the basis of a region in which a first layer is displayed based on the first layer displayed as an upper layer in a state that the image information is displayed thereon.

According to an embodiment, said step (b) may include displaying the pointer at a preset point of the region displayed with the first layer based on the first layer displayed as an upper layer.

According to another embodiment, said step (b) may include displaying the pointer in a region displayed with a preset object within the region displayed with the first layer based on the first layer displayed as an upper layer.

According to still another embodiment, said step (b) may include displaying the pointer at a position selected on the basis of history information to which the position of the pointer has been set by a user input based on the first layer displayed as an upper layer.

According to yet still another embodiment, said step (b) may include displaying the pointer in a region displayed with a preset layer among a plurality of layers based on the plurality of layers concurrently or sequentially displayed in a state that the image information is displayed on the display unit.

According to still yet another embodiment, said step (b) may include displaying the pointer in a region displayed with a preset content among a plurality of contents based on the plurality of contents displayed on the display unit.

The effects of an image display device and a control method thereof according to the present disclosure will be described as follows.

According to at least one of the embodiments of the present disclosure, there is an advantage capable of setting a position of a pointer in consideration of a newly displayed layer.

Furthermore, according to at least one of the embodiments of the present disclosure, there is an advantage capable of a display position of a pointer in consideration of a user's history.

As a result, it may be possible to enhance a user's convenience.

Further scope of applicability of the present invention will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 7A, 7B and 7C are conceptual views illustrating an embodiment in which a pointer is displayed in a region displayed with a preset layer among a plurality of layers;

FIGS. 11A, 11B and 11C are conceptual views illustrating an embodiment in which a pointer is displayed while searching a content;

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Hereinafter, an image display device associated with the present disclosure will be described in more detail with reference to the accompanying drawings.

An image display device according to the present disclosure may include both a device of recording and/or reproducing images and a device for recording and/or reproducing audio by receiving and outputting broadcasts. Hereinafter, a TV as an example of the image display device will be illustrated.

Figure 1:
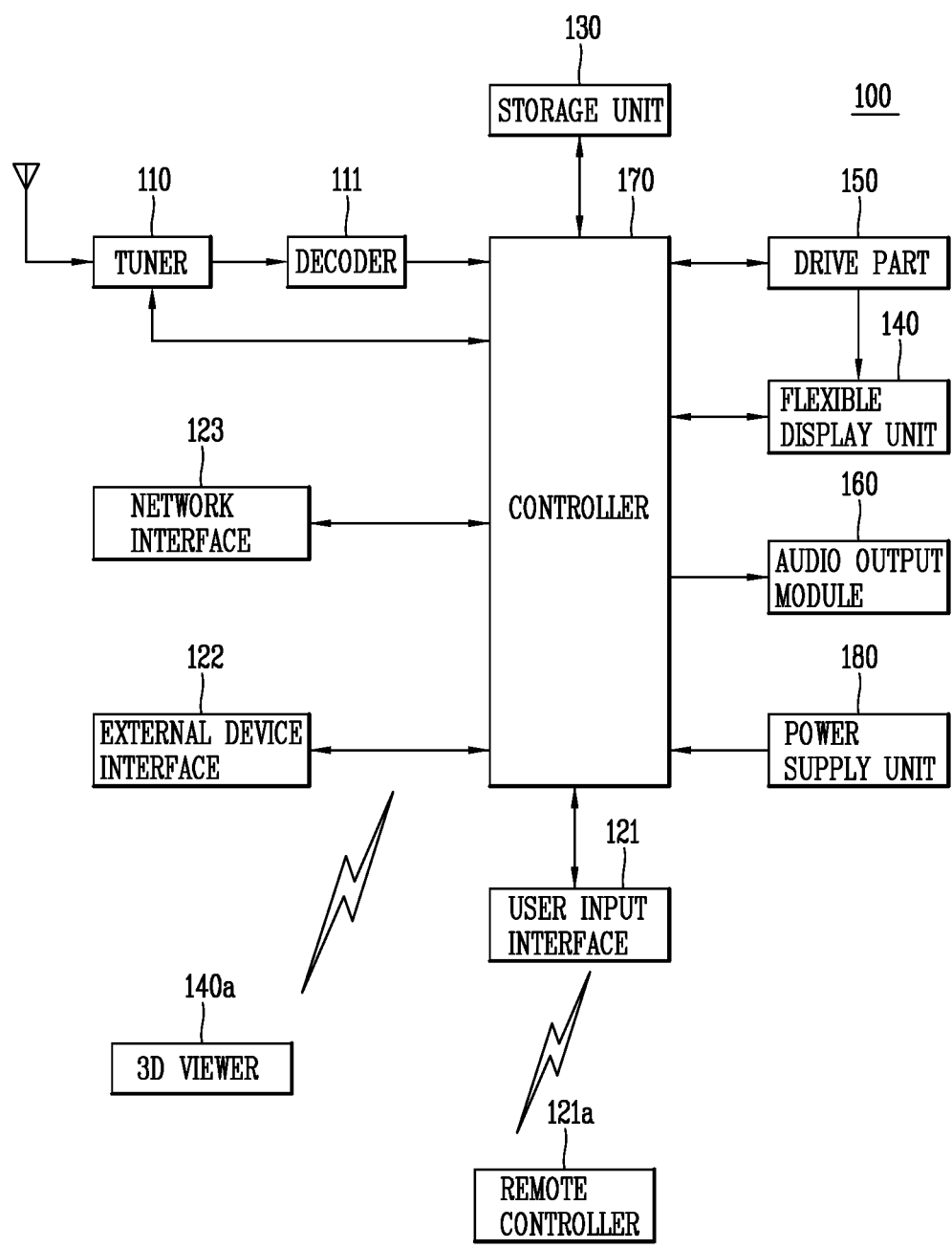
FIG. 1 is a block diagram illustrating an image display device and a remote controller associated with the present disclosure.

FIG. 1 is a block diagram of an image display device 100 and a remote controller 121a according to the present disclosure.

As illustrated in FIG. 1, the image display device 100 may include a tuner 110, a decoder 111, an external device interface 122, a network interface 123, a storage unit 130, a user input interface 121, a controller 180, a flexible display unit 140, a drive unit 150, an audio output unit 124, a power supply unit 190, and a 3D viewer 140a.

The tuner 110 may select a radio frequency (RF) broadcast signal, which corresponds to a channel selected by a user, among RF broadcast signals received through an antenna, or every pre-stored channel. The tuner 110 may also convert the selected RF broadcast signal into a medium frequency signal or a baseband video or audio signal.

For example, when the RF broadcast signal selected is a digital broadcast signal, the tuner 110 may convert the RF broadcast signal into a digital IF signal (DIF). On the other hand, when the RF broadcast signal is an analog broadcast signal, the tuner 110 may convert the RF broadcast signal into an analog baseband video or audio signal (CVBS/SIF). That is, the analog baseband image or audio signal (CVBS/SIF) outputted from the tuner 110 may be inputted directly into the controller 180.

Also, the tuner 110 may receive a signal carrier RF broadcast signal according to an advanced television systems committee (ATSC) standard or a multi-carrier RF broadcast signal according to a digital video broadcasting (DVB) standard.

Meanwhile, the tuner 110 may sequentially select RF broadcast signals of all the broadcast channels stored through a channel memory function, of RF broadcast signals received via an antenna, and convert those RF broadcast signals into a medium frequency signal or a baseband video or audio signal.

The decoder 111 may execute a decoding operation by receiving a digital IF signal (DIF) converted in the tuner 110.

For example, when the digital IF signal outputted from the tuner 110 is a signal according to the ATSC standard, the decoder 111 may perform 8-vestigial side band (8-VSB) demodulation. Here, the decoder 111 may also perform trellis decoding, de-interleaving, reed Solomon decoding and the like. To this end, the decoder 111 may include a trellis decoder, de-interleaver, a reed Solomon decoder and the like.

As another example, when the digital IF signal (DIF) outputted from the tuner 110 is a signal according to the DVB standard, the decoder 111 may perform a coded orthogonal frequency division modulation (COFDMA) demodulation. Here, the decoder 111 may also perform convolution decoding, de-interleaving, reed Solomon decoding and the like. To this end, the decoder 111 may include a convolution decoder, a de-interleaver, a reed Solomon decoder and the like.

The decoder 111 may output a stream signal after decoding and channel decoding. Here, the stream signal may be a signal in which a video signal, an audio signal and a data signal are multiplexed. As one example, the stream signal may be an MPEG-2 transport stream (TS) signal obtained by multiplexing an MPEG-2 video signal and a Dolby AC-3 audio signal. In detail, an MPEG-2 TS signal may include a 4-byte header and a 184-byte payload.

The decoder 111 may be provided separately according to the ATSC standard and the DVB standard. That is, an ATSC decoder and a DVB decoder may be provided.

The stream signal output from the decoder 111 may be inputted into the controller 180. The controller 180 may perform demultiplexing, video/audio signal processing and the like, output video on the flexible display unit 140 and output audio to the audio output unit 124.

The external device interface 122 may connect an external device and the image display device 100 to each other. To this end, the external device interface 122 may include an A/V input/output unit (not shown) or a wireless communication unit (not shown).

The external device interface 122 may be connected, in a wired or wireless manner, to an external device, such as a digital versatile disk (DVD), a Bluray, a game machine, a camera, a camcorder, a laptop computer (notebook) and the like. The external device interface 122 may transfer a video, audio or data signal input from the exterior via the connected external device to the controller 180 of the image display device 100, and also output a video, audio or data signal processed in the controller 180 to the external device. For this, the external device interface 122 may include the A/V input/output unit or the wireless communication unit.

The A/V input/output unit may include a USB terminal, a composite video banking sync (CVBS) terminal, a component terminal, a S-video terminal (analog), a digital visual interface (DVI) terminal, a high definition multimedia interface (HDMI) terminal, an RGB terminal, a D-SUB terminal, and the like to allow video and audio signals of the external device to be inputted into the image display device 100.

The wireless communication unit may execute short-range wireless communication with other electronic devices. The image display device 100 may be connected to the other electronic device via a network according to communication standards, such as Bluetooth, radio frequency identification (RFID), infrared data association (IrDA), ultra wideband (UWB), Zigbee and the like.

The external device interface 122 may also be connected via at least one of various set-top boxes and the aforementioned various terminals, to execute input/output operations with the set-top boxes.

The external device interface 122 may execute data transmission and reception with the 3D viewer 140a.

The network interface 123 may provide an interface for connecting the image display device 100 to a wired or wireless network which includes an Internet network. The network interface 123 may include an Ethernet terminal for connection to the wired network, and use communication standards, such as wireless LAN (WLAN) (Wi-Fi), wireless broadband (Wibro), world interoperability for microwave access (Wimax), high speed downlink packet access (HS-DPA) and the like for connection to the wireless network.

The network interface 123 may receive contents or data provided by a contents provider or a network operator via a network. That is, the network interface 123 may receive contents, such as a movie, an advertisement, a game, a VOD, a broadcast signal provided by the network operator, and related information via a network. The network interface 123 may also receive update information related to firmware and update files provided by the network operator. Also, the network interface 123 may transmit data to the contents provider or the network operator.

The network interface 123 may be connected to, for example, an Internet protocol (IP) TV, so as to receive a video, audio or data signal processed in an IPTV set-top box and transfer it to the controller 180 for allow bi-directional communication. The network interface 123 may also transfer signals processed in the controller 180 to the IPTV set-top box.

The IPTV may indicate ADSL-TV, VDSL-TV, FTTH-TV or the like or indicate TV over DSL, Video over DSL, TV overIP (TVIP), Broadband TV (BTV) or the like, according to a type of transmission network. Also, the IPTV may indicate an Internet-accessible Internet TV, and a full-browsing TV.

The storage unit 130 may store programs for signal processing and control by the controller 180, and also store processed video, audio or data signals.

The storage unit 130 may execute a function of temporarily storing a video, audio or data signal input via the external device interface 122. Also, the storage unit 130 may store information related to a predetermined broadcast channel through a channel memory function of a channel map and the like.

The storage unit 130 may include at least one storage medium of a flash memory-type storage medium, a hard disc-type storage medium, a multimedia card micro-type storage medium, a card-type memory (for example, SD or XD memory), a random access memory (RAM), a read-only memory (ROM) (e.g., electrically erasable programmable ROM (EEPROM)), and the like. The image display device 100 may reproduce a file (a video file, a still image file, a music file, a document file, etc.) stored in the storage unit 130 to provide to a user.

FIG. 1 illustrates an exemplary embodiment having the storage unit 130, separate from the controller 180. However, the storage unit 130 may alternatively be configured to be included in the controller 180.

The user input interface 121 may transfer a user-input signal to the controller 180, or a signal from the controller 180 to the user.

For example, the user input interface 121 may receive a user input signal, such as a power on/off, a channel selection, a screen setting and the like from the remote controller 121*a*, or transmit a signal from the controller to the remote controller 121*a*, according to various communication standards, such as RF communication, IR communication and the like.

The user input interface 121, for example, may also transfer a user input signal, which is inputted from a local key (not shown), such as a power key, a channel key, a volume key, or a setting key, to the controller 180, for example.

Also, for example, the user input interface 121 may transfer a user input signal, which is inputted from a sensing unit (not shown) for sensing a user's gesture, to the controller 180 or transmit a signal from the controller 180 to the sensing unit (not shown). Here, the sensing unit may include a touch sensor, a voice sensor, a position sensor, a motion sensor and the like.

The controller 180 may demultiplex stream, which is inputted via the tuner 110, the decoder 111 or the external device interface 122 or process the demultiplexed signals, to generate and output signals for outputting video or audio.

The video signal processed in the controller 180 may be inputted to the flexible display unit 140 to be outputted as an image corresponding to the image signal. Also, the video signal processed in the controller 180 may be inputted to an external output device through the external device interface 122.

The audio signal processed in the controller 180 may be outputted to the audio output unit 124. The audio signal processed in the controller 180 may be inputted to an external output device through the external device interface 122. Although not shown in FIG. 1, the controller 180 may include a demultiplexer, an image processor and the like.

Besides, the controller 180 may control an overall operation of the image display device 100. For example, the controller 180 may control the tuner 110 to select an RF broadcast corresponding to a user-selected channel or a pre-stored channel.

The controller 180 may also control the image display device 100 by a user command inputted via the user input interface 121 or an internal program.

For example, the controller 180 may control the tuner 110 to input a signal of a channel, which is selected in response to a predetermined channel select command received via the user input interface 121. The controller 180 may then process a video, audio or data signal of the selected channel. The controller 180 may control information related to the user-selected channel to be outputted through the flexible display unit 140 or the audio output unit 124 together with the processed video or audio signal.

As another example, the controller 180 may control a video signal or an audio signal, which is inputted from an external device, for example, a camera or a camcorder through the external device interface 122 in response to an external device image reproduce command received through the user input interface 121, to be outputted through the flexible display unit 140 or the audio output unit 124.

In the meantime, the controller 180 may control the flexible display unit 140 to display an image. For example, the controller 180 may control the flexible display unit 140 to output a broadcast image inputted through the tuner 110, an externally input image inputted through the external device interface 122, an image inputted through the network interface 123, or an image stored in the storage unit 130.

Here, the image output on the flexible display unit 140 may be a still image or a video, and a 2D or 3D image.

The controller 180 may allow a predetermined object within the image displayed on the flexible display unit 140 to be generated and displayed as a 3D object. For example, the object may be at least one of an accessed web screen (a newspaper, a journal, etc.), an electronic program guide (EPG), various menus, a widget, an icon, a still image, a video, and text.

The 3D object may be processed to have a different depth from the image displayed on the flexible display unit 140. Preferably, the 3D object may be processed to seem to protrude more than the image displayed on the flexible display unit 140.

In the meantime, the controller 180 may recognize a user's location based on an image captured by the capturing element (not shown). For example, the controller 180 may recognize a distance (z-axial coordinates) between the user and the image display device 100. Also, the controller 180 may recognize x-axial coordinates and y-axial coordinates within the image display device 100 corresponding to the user's location.

Although not shown, the image display device 100 may further include a channel browsing processor, which generates a thumbnail image corresponding to a channel signal or an externally input signal. The channel browsing processor may receive a stream signal outputted from the decoder 111 or a stream signal outputted from the external device interface 122, extract an image from the input stream signal, and generate a thumbnail image. The generated thumbnail image may be inputted to the controller 180 as it is or after being encoded. Also, the generated thumbnail image may be inputted to the controller 180 after being encoded into a stream format. The controller 180 may output on the flexible display unit 140 a thumbnail list including a plurality of thumbnail images using the input thumbnail image. The thumbnail list may be displayed in a briefly viewing manner in which the list is displayed on a partial region with displaying a predetermined image on the flexible display unit 140, or in a fully viewing manner in which the list is displayed on most regions of the flexible display unit 140.

The flexible display unit 140 may generate a driving signal by converting an image signal, a data signal, an OSD signal and a control signal processed in the controller 180, or an image signal, a data signal and a control signal received via the external device interface 122.

The present disclosure illustrates that the flexible display unit 140 is transformable (variable) into a flat form or a curved form. When the flexible display unit 140 is transformed into the curved form like surrounding a user located in front thereof, the flexible display unit 140 may provide the user with intense quality of image and allow the user to feel more involved in an image displayed thereon. The flexible display unit 140 may be implemented by an OLED panel, for example.

The flexible display unit 140 may be configured to provide a 3D image to a user. To view the 3D image, the flexible display unit 140 may be classified into an additional displaying method and an independent displaying method.

The independent displaying method may be configured such that a 3D image can be implemented only by the flexible display unit 140 without a separate 3D viewer 140a, for example, 3D glasses or the like. Various technologies such as a lenticular technology, a parallax barrier technology and the like may be applied as the independent displaying method.

The additional displaying method may be configured to implement a 3D image by using the 3D viewer 140a in addition to the flexible display unit 140. As one example, various methods such as a head mount display (HMD) type, a glass type and the like may be applied. Also, the glass type may be divided into a passive glass type such as a polarized glass type and the like, and an active glass type such as a shutter glass type and the like. The HMD type may also be divided into a passive HMD type and an active HMD type.

The flexible display unit 140 may be implemented as a touch screen so as to be used as an input device as well as an output device.

The drive unit 150 may transform the flexible display unit 140 into a flat form or a curved form. The drive unit 150 may transmit an electric signal to the flexible display unit 140 such that the flexible display unit 140 can be transformed by itself, or apply a physical force to the flexible display unit 140 directly or indirectly to transform the flexible display unit 140.

The audio output unit 124 may output sound by receiving an audio signal processed in the controller 180, for example, a stereo signal, a 3.1 channel signal or a 5.1 channel signal. The audio output unit 124 may be implemented into various types of speakers.

Meanwhile, to sense a user's gesture, as aforementioned, the image display device 100 may further include a sensing unit (not shown) having at least one of a touch sensor, a voice sensor, a location sensor, and a motion sensor. A signal sensed by the sensing unit may be transferred to the controller 180 via the user input interface 121.

The controller 180 may sense a user's gesture based on an image captured by the capturing element (not shown), a signal sensed by the sensing unit (not shown) or a combination thereof.

The power supply unit 190 may supply power to every component of the image display device 100. Especially, the power supply unit 190 may supply power to the controller 180 which may be implemented in a form of a system on chip (SOC), the flexible display unit 140 to display an image, and the audio output unit 185 to output an audio. Also, depending on embodiments, power may be supplied using a heat generator including a hot wire.

The remote controller 121a may transmit a user input to the user input interface 121. To this end, the remote controller 121a may use various communication standards, such as IR communication, RF communication, Bluetooth, ultra wideband (UWB), Zigbee and the like. Also, the remote controller 121a may receive a video, audio or data signal output from the user input interface 121, so as to display the signal on the remote controller 121a or output the signal on the remote controller 121a in form of sound.

The image display device 100 may be a fixed digital broadcast receiver capable of receiving at least one of ATSC (8-VSB) broadcast programs, DVB-T (COFDM) broadcast programs, and ISDB-T (BST-OFDM) broadcast programs or a mobile digital broadcast receiver capable of receiving at least one of terrestrial DMB broadcast programs, satellite DMB broadcast programs, ATSC-M/H broadcast programs, DVB-H (COFDM) broadcast programs, and Media Forward Link Only (MediaFLO) broadcast programs. Alternatively, the image display device 100 may be an IPTV digital broadcast receiver capable of receiving cable broadcast programs, satellite broadcast programs or IPTV programs.

The image display device disclosed herein may include a TV receiver, a cellular phone, a smart phone, a notebook computer, a digital broadcasting terminal, a personal digital assistant (PDA), a portable multimedia player (PMP) and the like.

The block diagram of the image display device illustrated in FIG. 1 is a block diagram of one exemplary embodiment. Each component of the block diagram may be combined, added or omitted according to the configuration of the image display device 100. That is, if necessary, two or more components may be combined into one component, or one component may be divided into two components. Also, a function performed in each block is merely illustrative, and a detailed operation or device may not limit the scope of the present disclosure.

Figure 2:
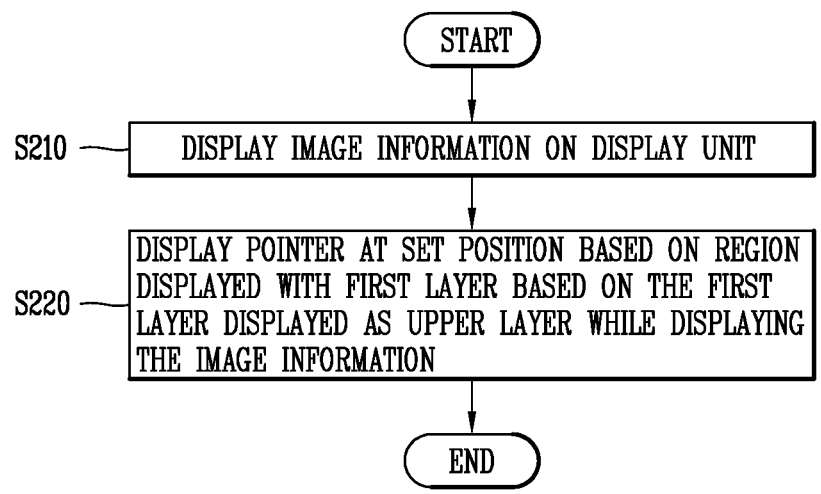
FIG. 2 is a flow chart for explaining a control method of an image display device associated with the present disclosure.

FIG. 2 is a flow chart for explaining a control method of an image display device associated with the present disclosure.

Referring to FIG. 2, first, the process (S210) of displaying image information on the display unit 140 is carried out.

The image information denotes visual information that can be displayed on the display unit 140, and may include a TV broadcast screen, an Internet broadcast screen, broadcast guide subtitles, a selectable menu, and the like.

Subsequently, the process of displaying a pointer at a position set on the basis of a region displayed with a first layer by the controller 180, based on the first layer displayed as an upper layer in a state that the image information is displayed.

The pointer may be defined as an indicator showing a position to which a user input can be applied. Furthermore, it may denote a cursor, and may be displayed as an arrow shape, a finger shape or the like.

For another embodiment, it may be displayed in a blinking state, and its displayed position may be determined by a user input. Specifically, the pointer may be displayed at a position indicated by the user with the remote controller 121a.

The first layer may be an upper layer displayed by a user input or the like in a state that image information is displayed on the display unit 140, and the entire or part thereof may be displayed to overlap with the image information.

For example, when a user pressurizes a menu button of the remote controller 121a in a state that a TV broadcast screen is being displayed, a layer containing a TV broadcast screen menu may be displayed as an upper layer in one of the screen 140. Here, the content of the TV broadcast screen may be completely hidden or checked by the user according to the transparency of the upper layer.

According to an embodiment, the process S220 may include a process of displaying the pointer at a preset position of a region displayed with the first layer based on the first layer displayed as an upper layer.

Specifically, the pointer may be displayed at a center point of the region displayed with the first layer.

According to another embodiment, the process S220 may include a process of displaying the pointer in a region displayed with a preset object within the region displayed with the first layer based on the first layer displayed as an upper layer.

According to still another embodiment, the process S220 may include a process of displaying the pointer at a position selected on the basis of history information to which the position of the pointer has been set by a user input based on the first layer displayed as an upper layer.

Specifically, the pointer may be displayed at any position based on history information to which the position of the pointer has been set above a preset number of times at the any position by a user input based on the first layer displayed as an upper layer.

According to yet still another embodiment, the process S220 may include a process of displaying in a region displayed with a preset object in response to image information being displayed on the display unit based on the first layer displayed as an upper layer.

According to still yet another embodiment, the process S220 may include a process of displaying the pointer in a region displayed with a preset layer among a plurality of layers based on the plurality of layers concurrently or sequentially displayed in a state that the image information is displayed on the display unit.

Specifically, the pointer may be displayed in a region displayed with a topmost layer among the plurality of layers.

According to yet still another embodiment, the process S220 may include a process of displaying the pointer in a region displayed with a preset content among a plurality of contents based on the plurality of contents displayed on the display unit.

Specifically, the controller may display the pointer in a region allowed for a user input. For example, in case of a smart TV, the pointer may be displayed on an Internet search window or web browser window or the like.

According to still yet another embodiment, the pointer may be displayed on a pause or stop icon for a video content when the video content is being played back, and the pointer may be displayed on a playback icon for the video content when the video content is in a pause or stop state.

According to yet still another embodiment, the pointer may be displayed in a region displayed with a content that has been selected above a preset number of time by a user among the plurality of contents.

According to still yet another embodiment, the pointer may be moved to a region displayed with a second content that has been selected above a preset number of times by the user among the plurality of contents based on a user input for searching the plurality of contents that is applied thereto in a state that that the pointer is displayed in a region displayed with a first content.

Hereinafter, a specific embodiment will be described with reference to the accompanying drawings.

On the other hand, the controller 180 may display the pointer at a preset point of the region displayed with the first layer based on the first layer displayed as an upper layer. Specifically, the controller may display the pointer at a center point of the region displayed with the first layer.

Figure 3:
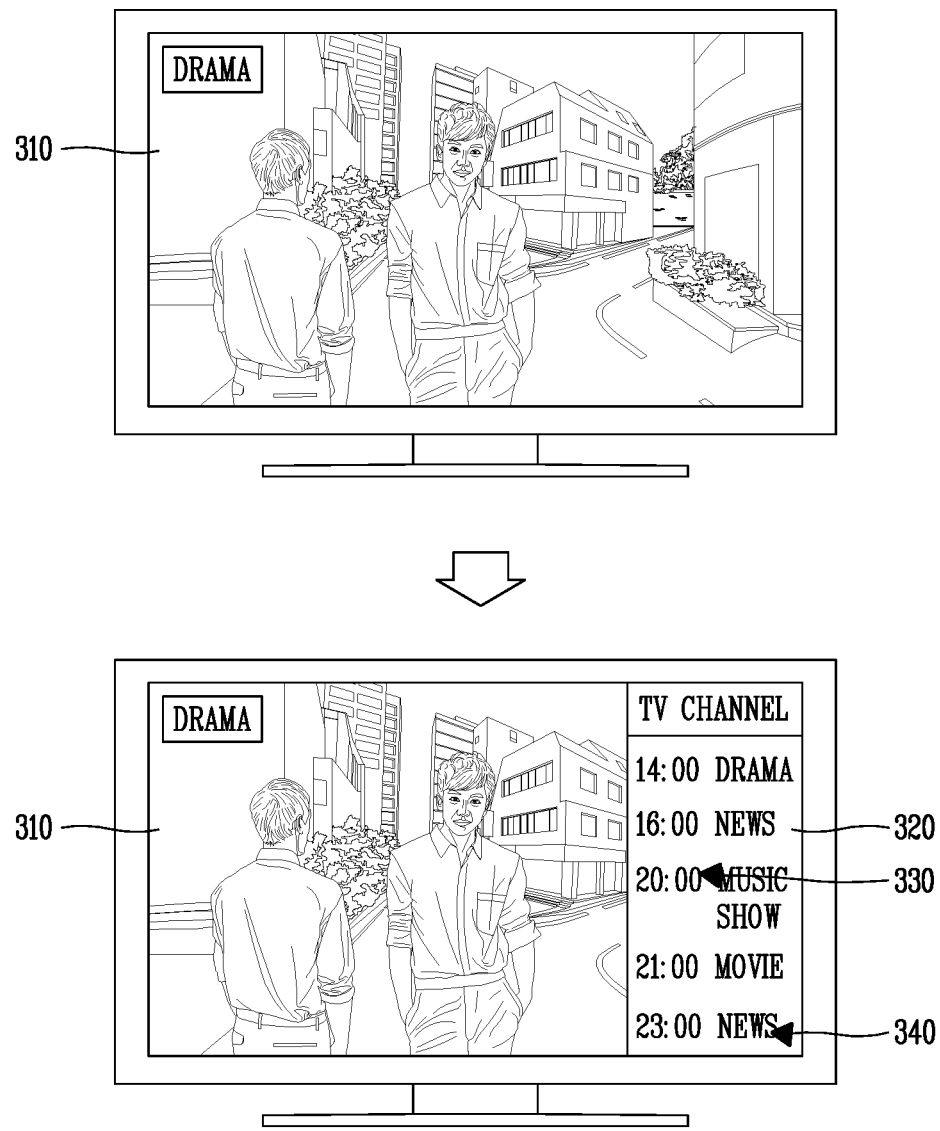
FIG. 3 is a conceptual view illustrating an embodiment in which a pointer is displayed at a preset point of an upper layer.

FIG. 3 is a conceptual view illustrating an embodiment in which a pointer is displayed at a preset point of an upper layer.

Referring to FIG. 3, an upper layer 320 may be displayed by the manipulation of the remote controller 121a of the user in a state that a TV broadcast image 310 is being displayed. For example, when a user applies a touch or push input to a menu button of the remote controller 121a, an upper layer 320 containing TV broadcast channel information may be displayed. Here, the content of the TV broadcast image 310 may be hidden or dimly seen according to the transparency of the upper layer 320.

A pointer may be displayed at a preset point of a region displayed with the upper layer 320 at the same time or in a sequential manner with the display of the upper layer 320. For an embodiment, a pointer may be displayed at a center point 330 of a region displayed with the upper layer 320.

Otherwise, it may be displayed in any region 340 that does not hide TV broadcast channel information, for example, in an edge region 340 of the upper layer 320.

On the other hand, the controller 180 may display the pointer in a region displayed with a preset object within the region displayed with the first layer based on the first layer displayed as an upper layer.

Figure 4:
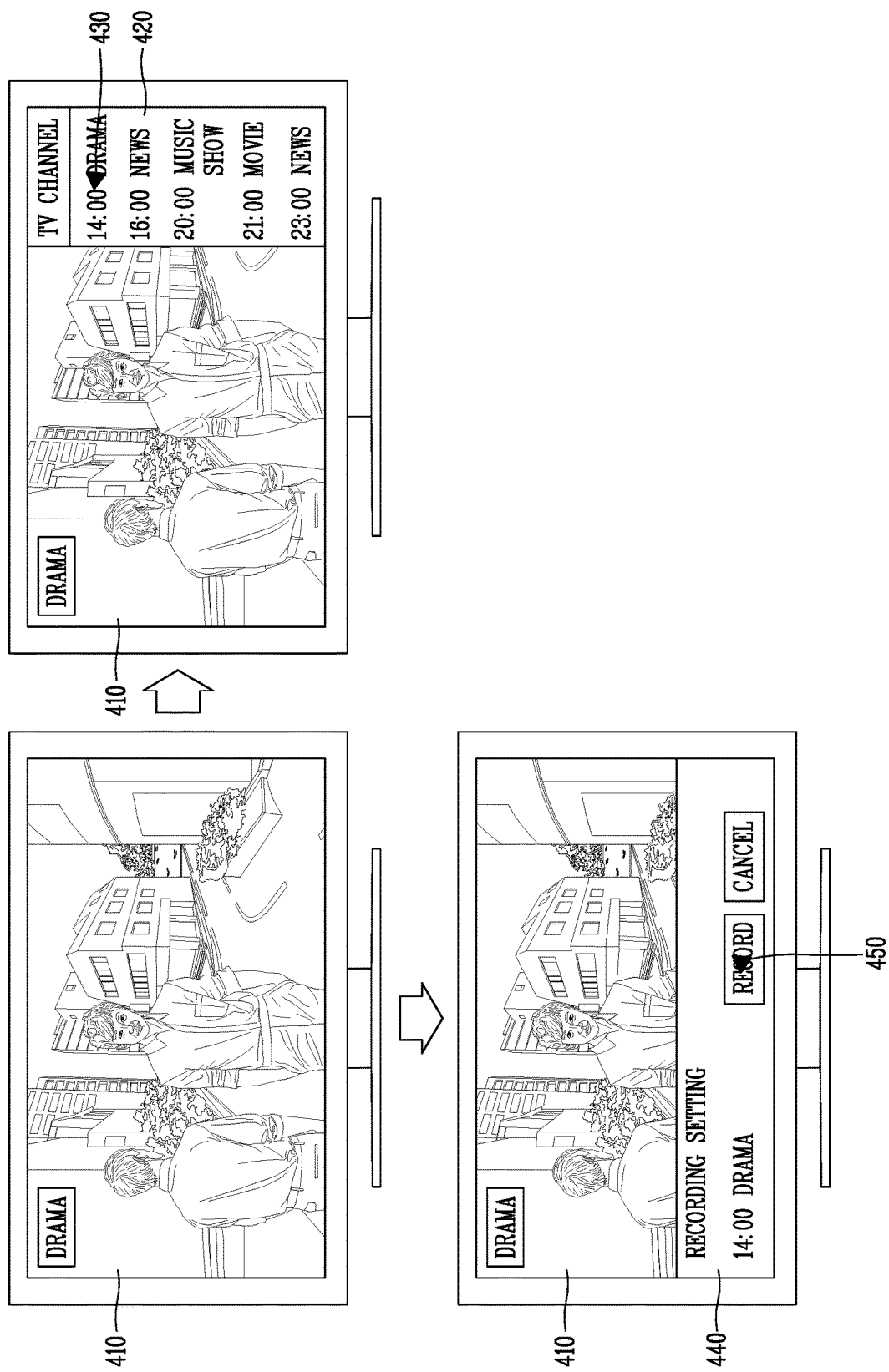
FIG. 4 is a conceptual view illustrating an embodiment in which a pointer is displayed in a region displayed with a preset object.

FIG. 4 is a conceptual view illustrating an embodiment in which a pointer is displayed in a region displayed with a preset object.

Referring to FIG. 4, an upper layer 420 may be displayed by the manipulation of the remote controller 121a of the user in a state that a N broadcast image 410 is being displayed. For example, when a user applies a touch or push input to a menu button of the remote controller 121a, an upper layer 420 containing TV broadcast channel information may be displayed. Here, the content of the TV broadcast image 410 may be hidden or dimly seen according to the transparency of the upper layer 420.

A pointer may be displayed in a region displayed with a preset object within a region displayed with the upper layer 420 at the same time or in a sequential manner with the display of the upper layer 420. For an embodiment, a pointer may be displayed in a region 430 displayed with channel information corresponding to a current time among TV broadcast channel information.

For another embodiment, when a user applies a touch or push input to a record button of the remote controller 121a, an upper layer 440 for TV broadcast record settings may be displayed. Here, the content of the TV broadcast image 410 may be hidden or dimly seen according to the transparency of the upper layer 440.

A pointer may be displayed on one of icons for TV broadcast record settings at the same time or in a sequential manner with the display of the upper layer 440. For an embodiment, a pointer may be displayed in a region 430 displayed with channel information corresponding to a current time among TV broadcast channel information.

On the other hand, the controller 180 may display the pointer at a position selected on the basis of history information to which the position of the pointer has been set by a user input based on the first layer displayed as an upper layer.

Specifically, the controller may display the pointer at any position based on history information to which the position of the pointer has been set above a preset number of times at the any position by a user input based on the first layer displayed as an upper layer.

Figure 5:
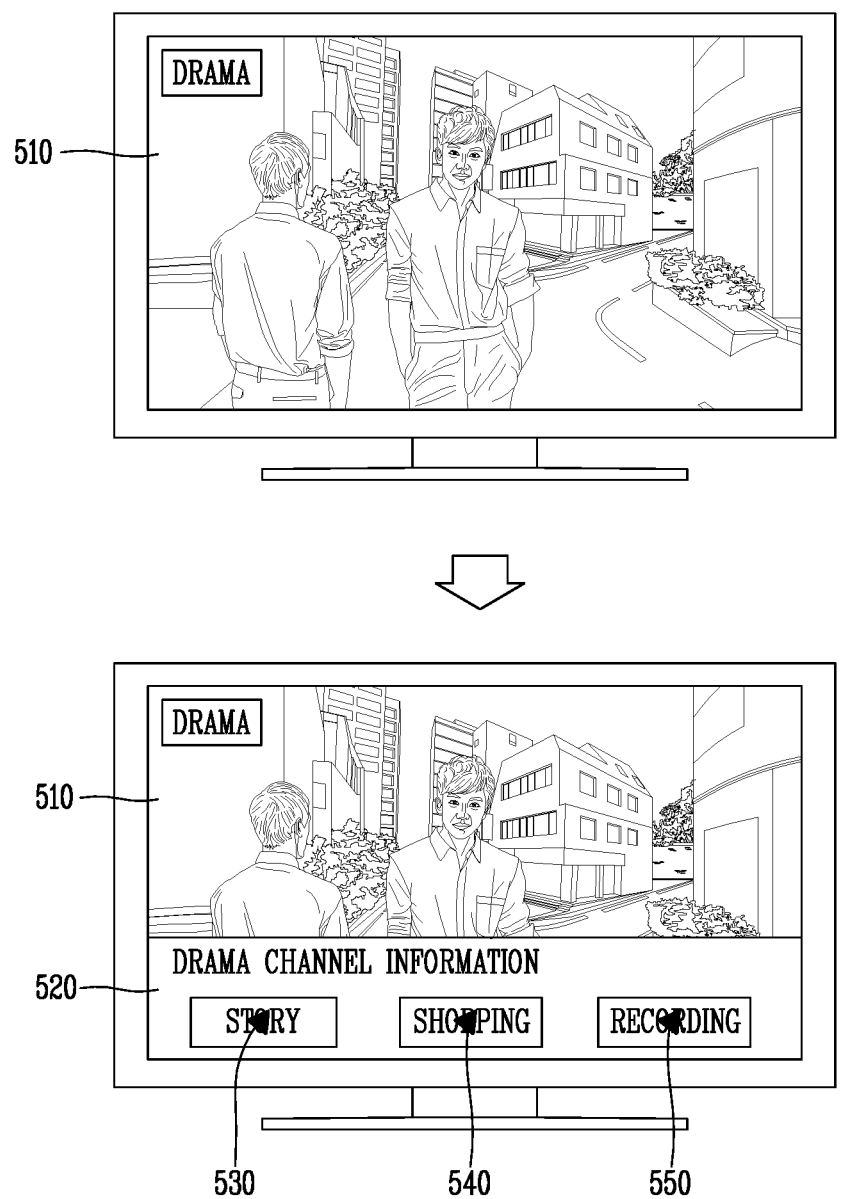
FIG. 5 is a conceptual view illustrating an embodiment in which a pointer is displayed at a position selected on the basis of history information to which a position of a pointer has been set.

FIG. 5 is a conceptual view illustrating an embodiment in which a pointer is displayed at a position selected on the basis of history information to which a position of a pointer has been set.

Referring to FIG. 5, an upper layer 520 may be displayed by the manipulation of the remote controller 121a of the user in a state that a TV broadcast image 510 is being displayed. For example, when a user applies a touch or push input to a check button of the remote controller 121a, an upper layer 320 containing the information of currently broadcasting channels may be displayed. Here, the content of the TV broadcast image 510 may be hidden or dimly seen according to the transparency of the upper layer 520.

A pointer may be displayed at a position selected on the basis of history information to which the position of the pointer has been set by a user input at the same time or in a sequential manner with the display of the upper layer 520.

For an embodiment, when a user displays the upper layer 520 containing the information of a currently broadcasting drama channel, a pointer may be displayed on a last story view icon 530 in case that there exists history information in which the position of the pointer is brought to the last story view icon 530 above a preset number of times.

For another embodiment, when a user displays the upper layer 520 containing the information of a currently broadcasting drama channel, a pointer may be displayed on a shopping icon 540 in case that there exists history information in which the position of the pointer is brought to the icon 540 for shopping a product shown in a drama above a preset number of times.

For still another embodiment, when a user displays the upper layer 520 containing the information of a currently broadcasting drama channel, a pointer may be displayed on a recording start icon 550 in case that there exists history information in which the position of the pointer is brought to the recording start icon 550 above a preset number of times.

On the other hand, the controller 180 may display the pointer in a region displayed with a preset object in response to image information being displayed on the display unit 140 based on the first layer displayed as an upper layer.

Figure 6A:
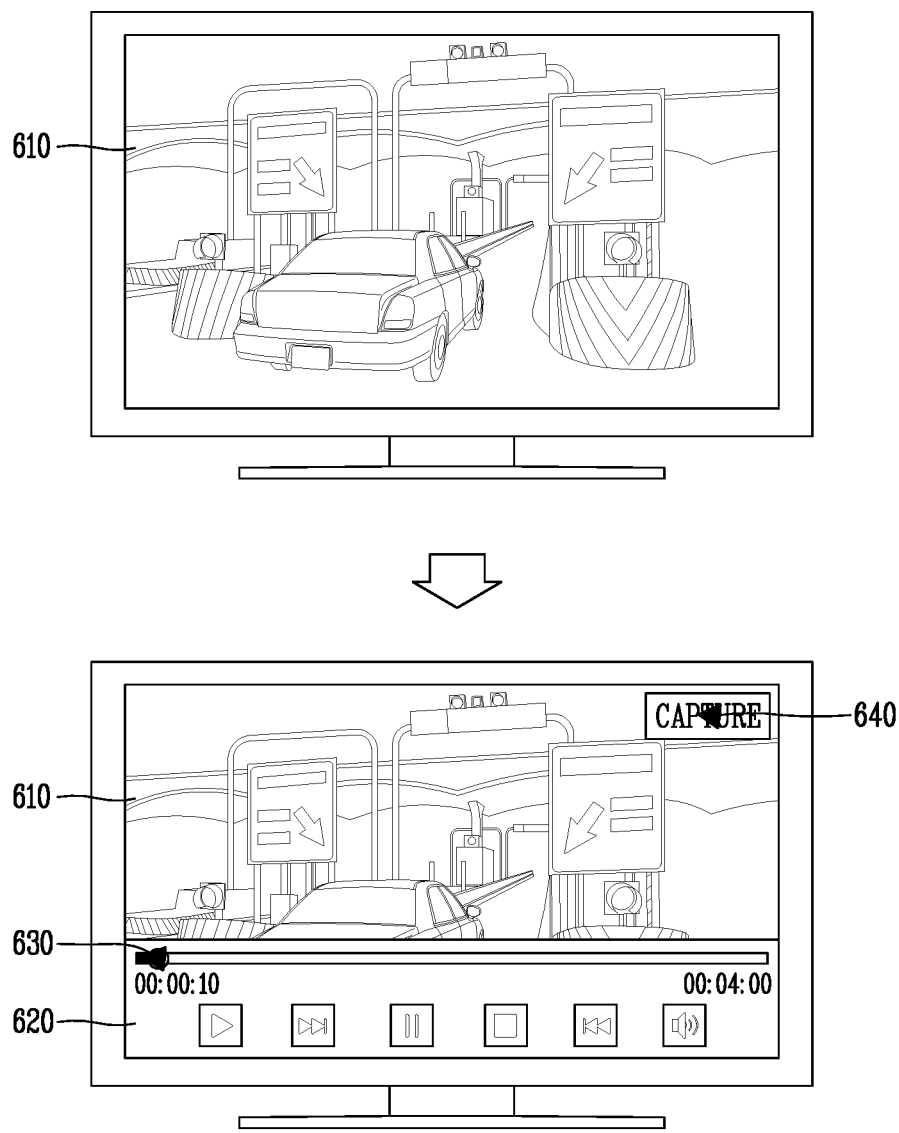
FIGS. 6A and 6B are conceptual views illustrating an embodiment in which a pointer is displayed in a region displayed with a preset object in response to image information being displayed on the display unit.
Figure 6B:
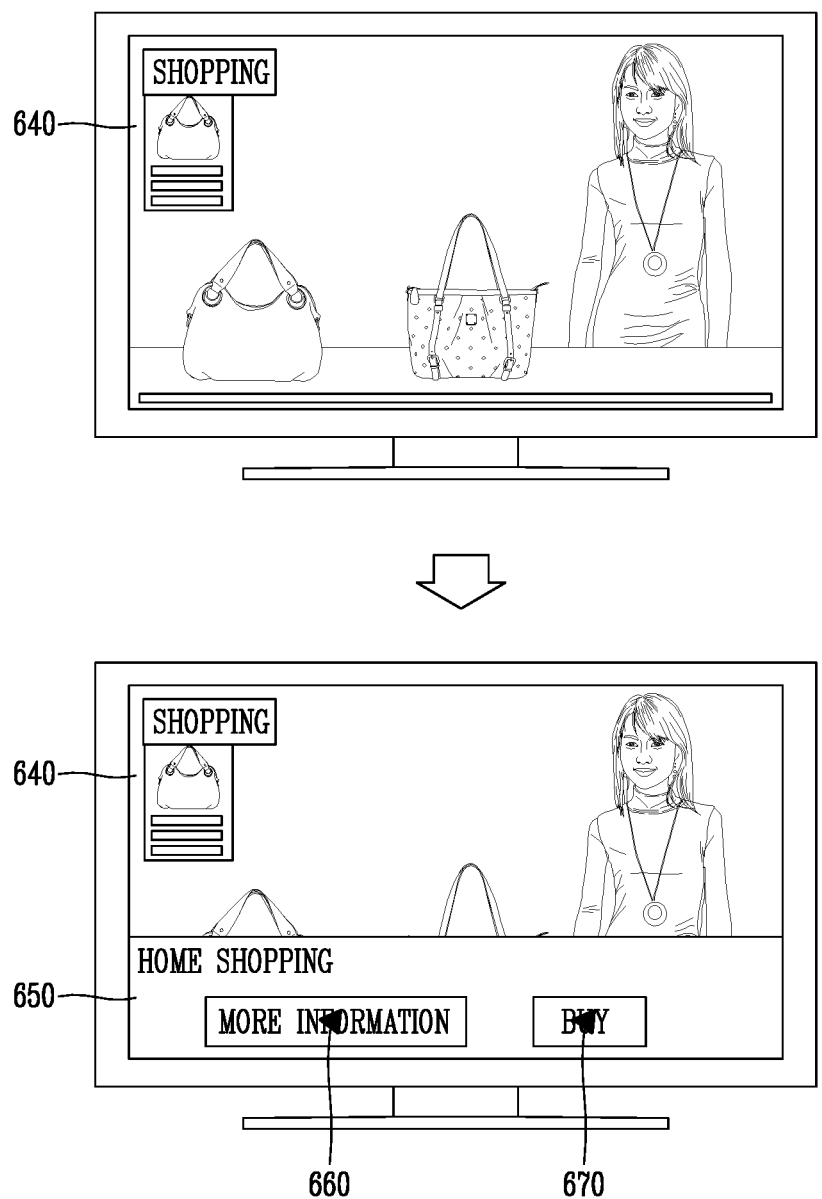

FIGS. 6A and 6B are conceptual views illustrating an embodiment in which a pointer is displayed in a region displayed with a preset object in response to image information being displayed on the display unit.

Referring to FIG. 6A, an upper layer 620 may be displayed by the manipulation of the remote controller 121a of the user in a state that a video 610 is being displayed. For example, when a user applies a touch or push input to a check button of the remote controller 121a, an upper layer 620 containing an icon capable of setting a playback state of the video may be displayed. Here, the content of the video 610 may be hidden or dimly seen according to the transparency of the upper layer 620.

A pointer may be displayed in a region displayed with a preset object in response to image information being displayed on the display unit 140 at the same time or in a sequential manner with the display of the upper layer 620.

Specifically, a pointer may be displayed on a status bar 630 capable of setting a playback state of the video. For another embodiment, a pointer may be displayed on a capture icon 640 capable of capturing a video image.

For another embodiment, referring to FIG. 6B, an upper layer 650 may be displayed by the manipulation of the remote controller 121a of the user in a state that a home shopping broadcast image 640 is being displayed. For example, when a user applies a touch or push input to a check button of the remote controller 121a, an upper layer 650 containing home shopping broadcast information may be displayed. Here, the content of the home shopping broadcast image 640 may be hidden or dimly seen according to the transparency of the upper layer 650.

A pointer may be displayed on an icon 660 capable of checking more product information at the same time or in a sequential manner with the display of the upper layer 650. Otherwise, a pointer may be displayed on an icon 670 for shopping products.

On the other hand, the controller 180 may display the pointer in a region displayed with a preset layer among a plurality of layers based on the plurality of layers concurrently or sequentially displayed in a state that the image information is displayed on the display unit 140. For an embodiment, the pointer may be displayed in a region displayed with a topmost layer among the plurality of layers.

Figure 7B:
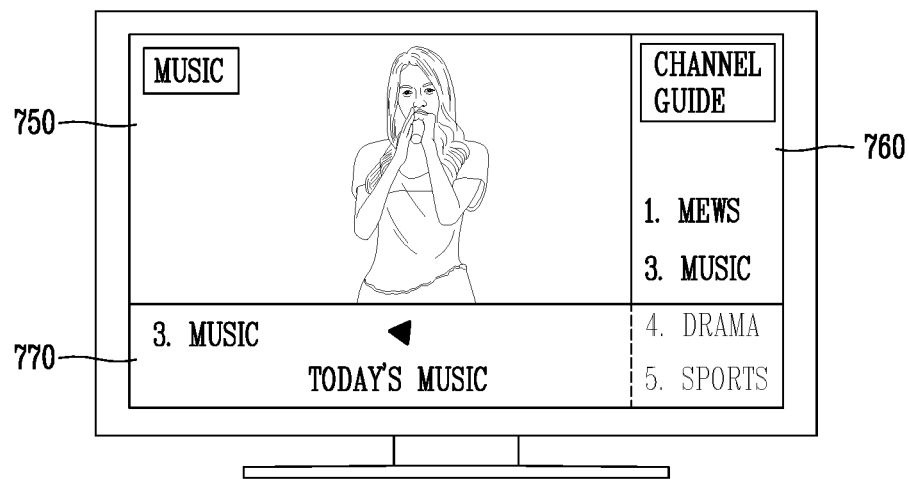
Figure 7C:
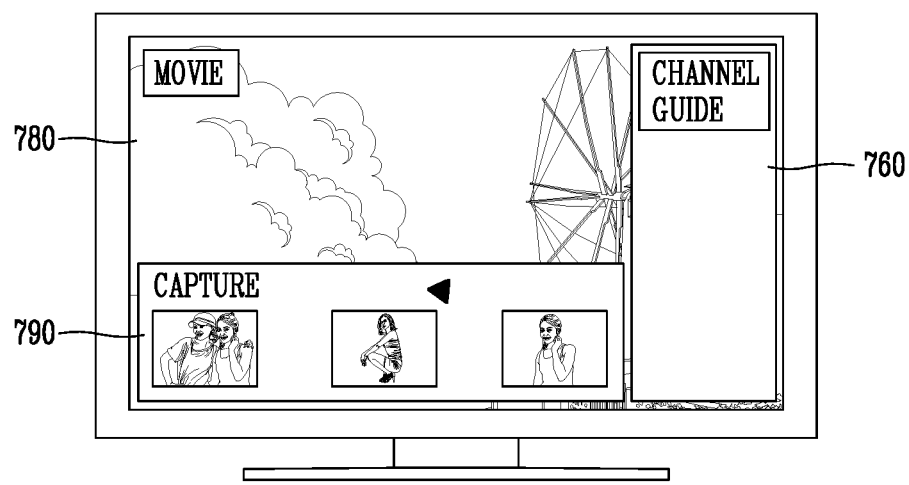

FIGS. 7A, 7B and 7C are conceptual views illustrating an embodiment in which a pointer is displayed in a region displayed with a preset layer among a plurality of layers.

Referring to FIG. 7A, a first layer 720 may be displayed by the manipulation of the remote controller 121a or voice command of the user in a state that a TV broadcast image 710 is being displayed. For example, when a user issues a voice command such as "increase volume", the first layer 720 for volume adjustment may be displayed as an upper layer of the TV broadcast image 710.

Here, the content of the TV broadcast image 710 may be hidden or dimly seen according to the transparency of the first layer 720. Furthermore, a pointer that has been displayed on an icon 730 for volume adjustment within a region displayed with the first layer 720 at the same time or in a sequential manner with the display of the first layer 720.

Subsequently, when a user applies a touch or push input to a check button of the remote controller 121a, a second layer 740 containing the information of currently broadcasting channels may be displayed as an upper layer of the first layer 720. In other words, the second layer 740 may be displayed as a topmost layer.

Here, the content of the TV broadcast image 710 and first layer 720 may be hidden or dimly seen according to the transparency of the second layer 740. Furthermore, a pointer that has been displayed on the icon 730 for volume adjustment may be moved to the second layer 740 containing the information of currently broadcasting channels at the same time or in a sequential manner with the display of the first layer 720.

Referring to FIG. 7B, when the power of the image display device 100 is turned on, a previously viewed channel image 750 may be displayed. Furthermore, a first layer 760 containing channel guide information as an upper layer of the channel image 750 and a second layer 770 containing the channel image 750 as an upper layer of the first layer 760 are displayed at the same time.

Accordingly, between the first layer 760 and the second layer 770, a pointer may be displayed on the second 760 to which a priority is set by a user.

For another embodiment, a pointer may be displayed on a layer 770 calculated based on a user's previous history information. Specifically, when both the first layer 760 and second layer 770 are displayed, a pointer may be displayed on the second layer 770 based on a history in which currently viewing channel information has been more frequently checked by the user.

Referring to FIG. 7C, when a preset voice command or gesture is sensed in a state that a video playback screen 780 is being displayed, the first layer 760 containing channel guide information and a third layer 790 containing the capture information of the video playback screen 780 may be sequentially or concurrently displayed.

Accordingly, between the first layer 760 and the third layer 790, a pointer may be displayed on the third layer 790 based on that a currently displayed image is a video. In other words, a pointer may be displayed in a region calculated in consideration of the characteristic, type and the like of the currently displayed screen information 780.

On the other hand, the controller 180 may display the pointer in a region displayed with a preset content among a plurality of contents based on the plurality of contents displayed on the display unit. Specifically, the controller may display the pointer in a region allowed for a user input.

Figure 8A:
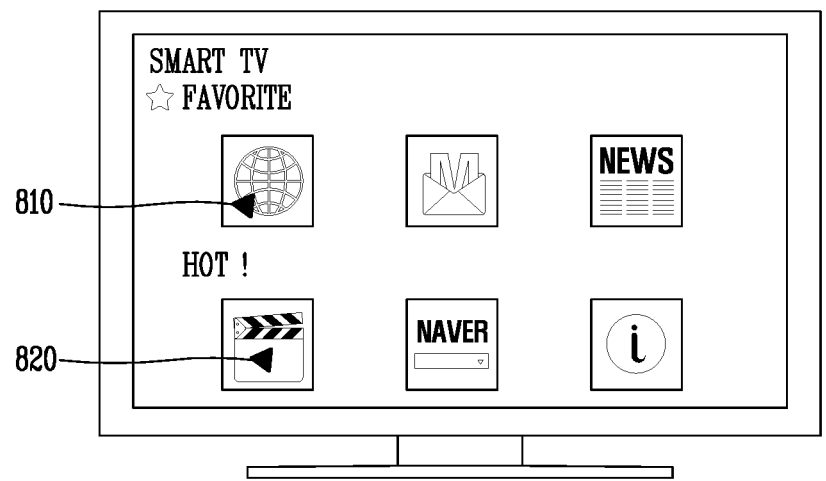
FIGS. 8A, 8B and 8C are conceptual views illustrating an embodiment in which a pointer is displayed in a region displayed with a preset content among a plurality of contents.
Figure 8B:
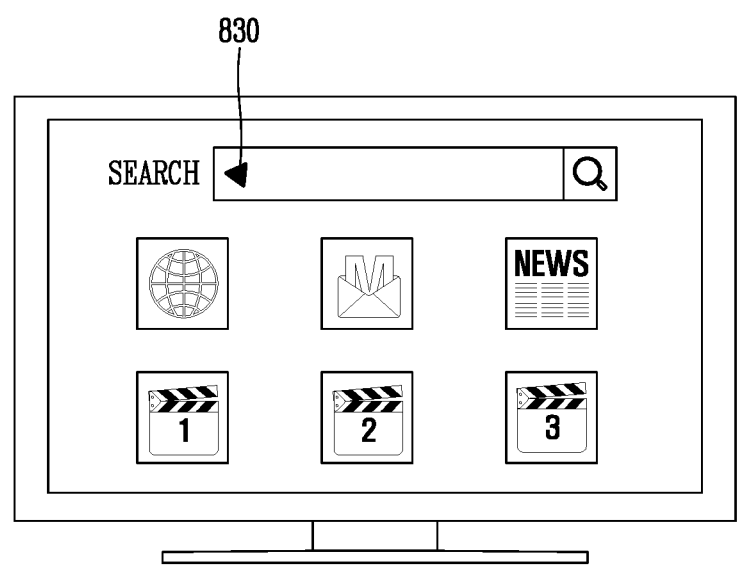
Figure 8C:
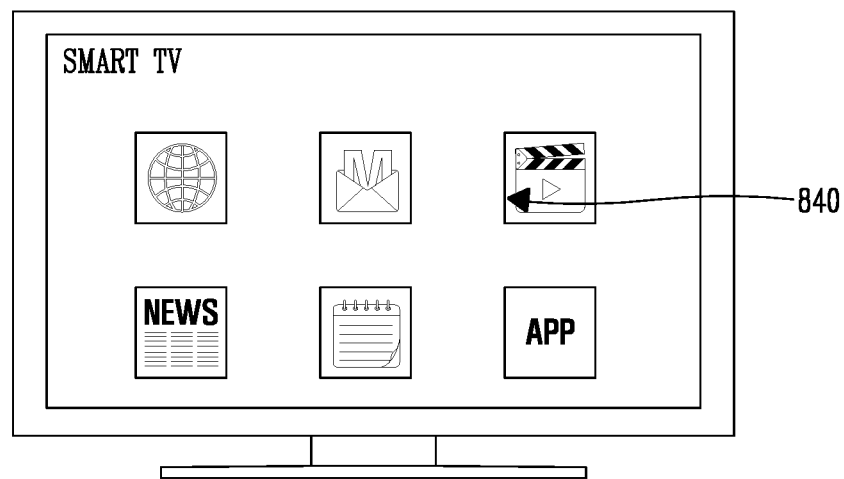

FIGS. 8A, 8B and 8C are conceptual views illustrating an embodiment in which a pointer is displayed in a region displayed with a preset content among a plurality of contents.

Referring to FIG. 8A, a pointer may be displayed in a region 810 displayed with a content set to a user's frequently executed one among a plurality of contents. Otherwise, a pointer may be displayed in a region 820 displayed with a content for which a number of times executed by a plurality of users is above a preset number of times for a preset period of time. For example, a pointer may be displayed in the region 820 displayed with a content that has been executed by most users for a week.

Referring to FIG. 8B, a pointer may be displayed in a region 830 allowed for a user input. For an embodiment, a pointer may be displayed on an input window for content search. For another embodiment, a pointer may be displayed on an Internet search window or web browser input window when an Internet execution screen is being displayed.

Referring to FIG. 8C, a pointer may be displayed in region 840 displayed with a video content in consideration of the type of the content. For example, a pointer may be displayed in a region 840 displayed with a video content among a webpage, an application, a text, and a video content.

On the other hand, the controller 180 may display the pointer on a pause or stop icon for a video content when the video content is being played back, and display the pointer on a playback icon for the video content when the video content is in a pause or stop state.

Figure 9A:
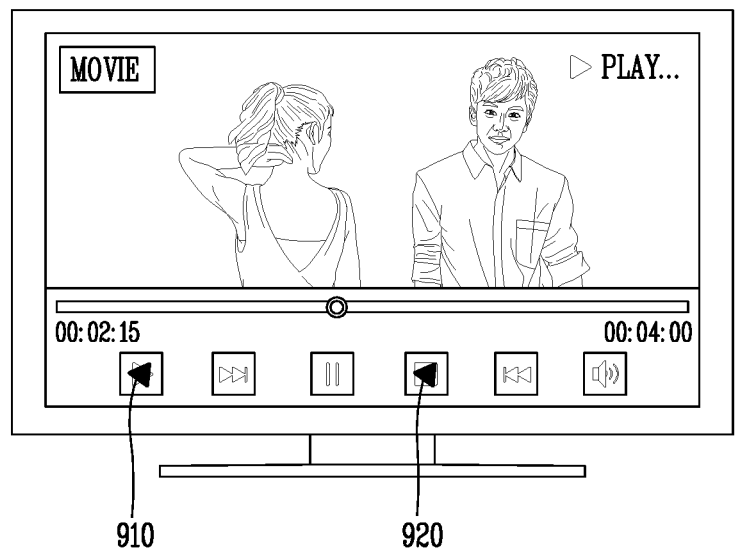
FIGS. 9A and 9B are conceptual views illustrating an embodiment in which a pointer is displayed while displaying a video content.
Figure 9B:
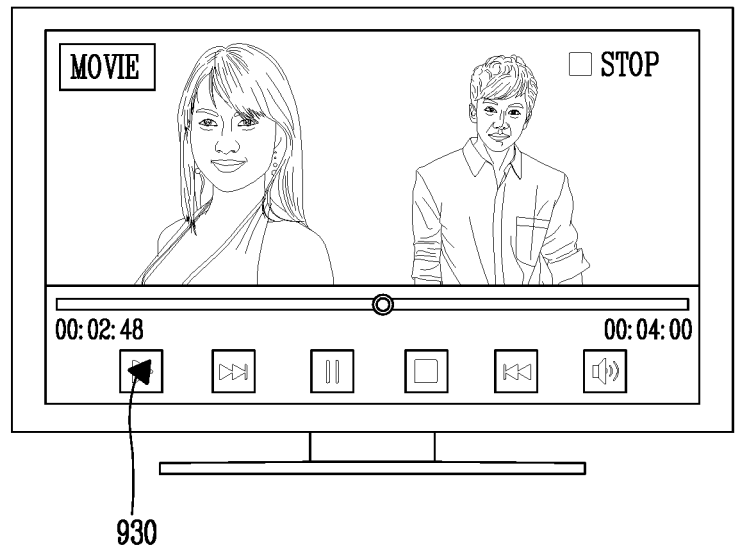

FIGS. 9A and 9B are conceptual views illustrating an embodiment in which a pointer is displayed while displaying a video content.

Referring to FIG. 9A, when a video content is being played back, a pointer may be displayed on a pause icon 910 or stop icon 920.

Referring to FIG. 9B, when a video content is in a pause or stop state, a pointer may be displayed on a playback icon 930.

On the other hand, the controller 180 may display the pointer in a region displayed with a content that has been selected by a user above a preset number of times among a plurality of contents. In other words, a pointer may be displayed in consideration of history information that has been executed by a user.

Figure 10:
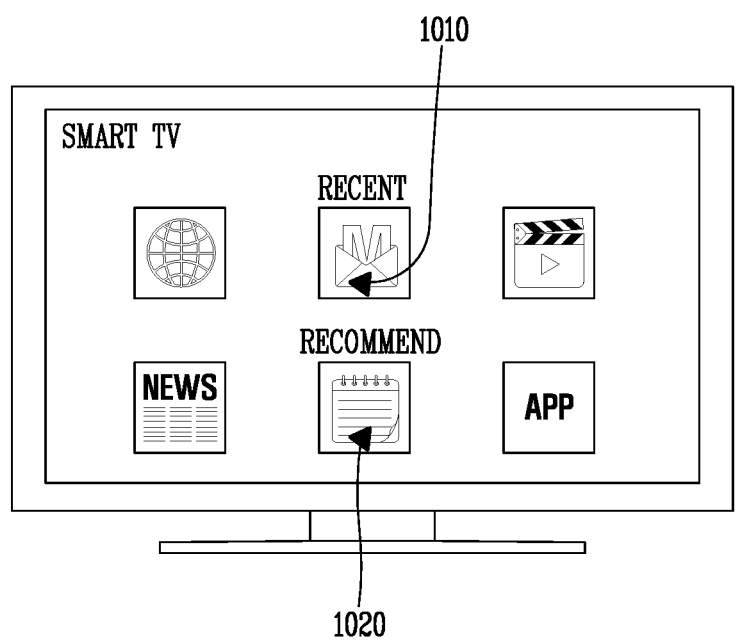
FIG. 10 is a conceptual view illustrating an embodiment in which a pointer is displayed in a region displayed a content that has been selected above a preset number of times by a user among a plurality of contents.

FIG. 10 is a conceptual view illustrating an embodiment in which a pointer is displayed in a region displayed a content that has been selected above a preset number of times by a user among a plurality of contents.

Referring to FIG. 10, a pointer may be displayed in a region 1010 displayed with a content that has been recently executed by a user among a plurality of contents.

For another embodiment, the controller 180 may calculate a frequently executed content based on a number of times in which the content has been executed by a user for a predetermined period of time, and display a pointer in a region 1020 displayed with the calculated content.

For still another embodiment, the controller 180 may calculate a content that has been frequently executed by a user during a current time zone in consideration of a current time, and display a pointer in the region 1020 displayed with the calculated content.

On the other hand, the controller 180 may move the pointer to a region displayed with a second content that has been selected by the user above a preset number of times among a plurality of contents based on the application of a user input for searching the plurality of contents in a state that the pointer is displayed in a region displayed with a first content.

Figure 11C:
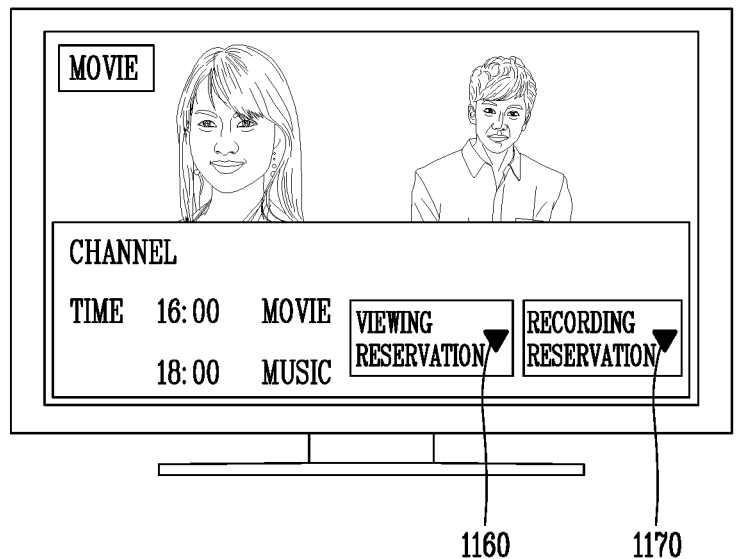

FIGS. 11A, 11B and 11C are conceptual views illustrating an embodiment in which a pointer is displayed while searching a content.

Referring to FIG. 11A, a user input for searching a plurality of contents may be applied in a state that a pointer is displayed in a region 1110 displayed with a first content. For example, a plurality of content lists may be displayed by a voice command or gesture.

A pointer may be moved to a region 1120 displayed with a second content that has been frequently executed by a user among a plurality of contents based on the application of such a user input.

For another embodiment, a pointer may be moved to a previously set region 1120 to move the pointer when a user searches contents.

Referring to FIG. 11B, a plurality of channel lists may be turned over by a voice command or gesture. For example, when a user applies a flicking gesture in a left direction using the remote controller 121a, the plurality of channel lists may be displayed in a direction 1130 corresponding to this.

Here, the shape, size, color or the like of a pointer may be differently displayed according to a speed or level of the user's applied flicking gesture. For example, when the user applies a flicking gesture at high speed, a pointer 1140 may be displayed in an increased size (1150).

Referring to FIG. 11C, when a voice command or gesture for searching currently broadcasting channel listings is applied, time and channel information or the like may be displayed. Here, a pointer may be displayed on an icon 1160 to make viewing reservations for channels to be broadcasted next time. Otherwise, a pointer may be displayed on an icon 1170 for recording reservations.

On the other hand, a screen mirroring function may be carried out to display an image being displayed on an external terminal on the display unit 140 of the smart TV 100.

Specifically, an external terminal may be a mobile terminal or stationary terminal. The mobile terminal may include a portable phone, a smart phone, a laptop computer, a digital broadcast terminal, a personal digital assistant (PDA), a mobile multimedia player (PMP), a navigation, a slate PC, a tablet PC, an ultrabook, a wearable device (for example, a smart watch, a smart glass, a head mounted display (HMD)), and the like. Furthermore, the stationary terminal may include a digital TV, a desktop computer, a digital signage, and the like.

Figure 12A:
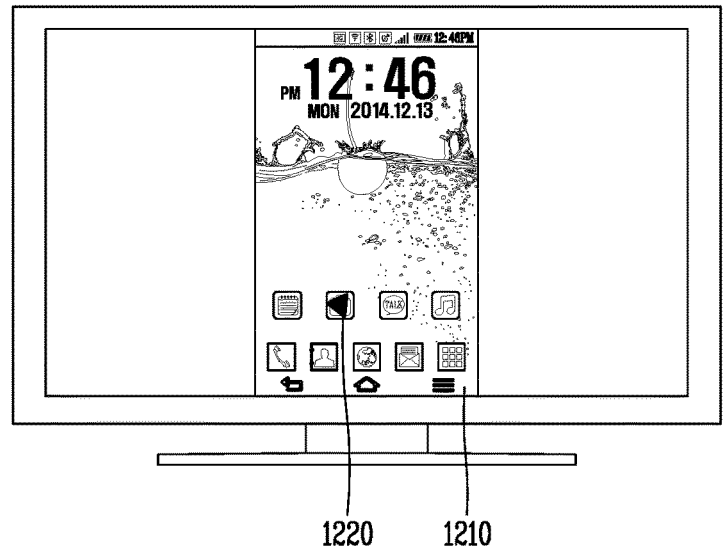
FIGS. 12A, 12B and 12C are conceptual views illustrating an embodiment in which a pointer is displayed during screen mirroring.
Figure 12B:
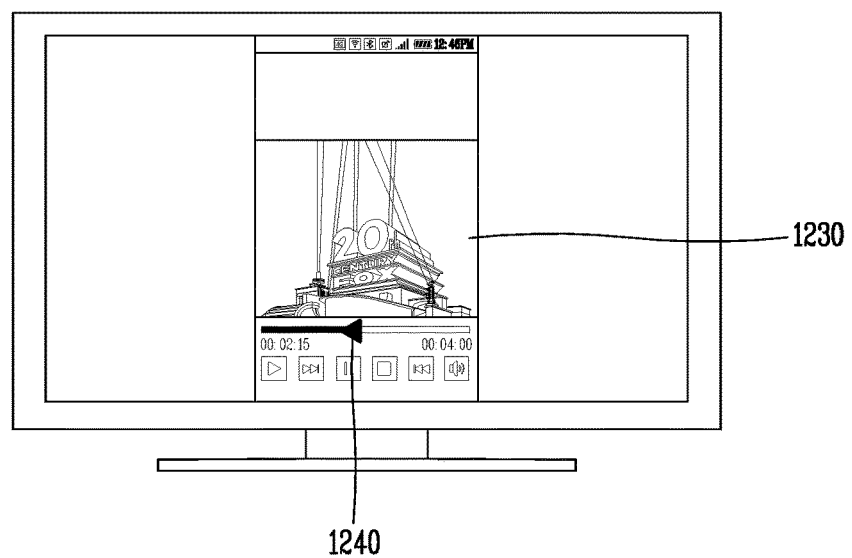
Figure 12C:
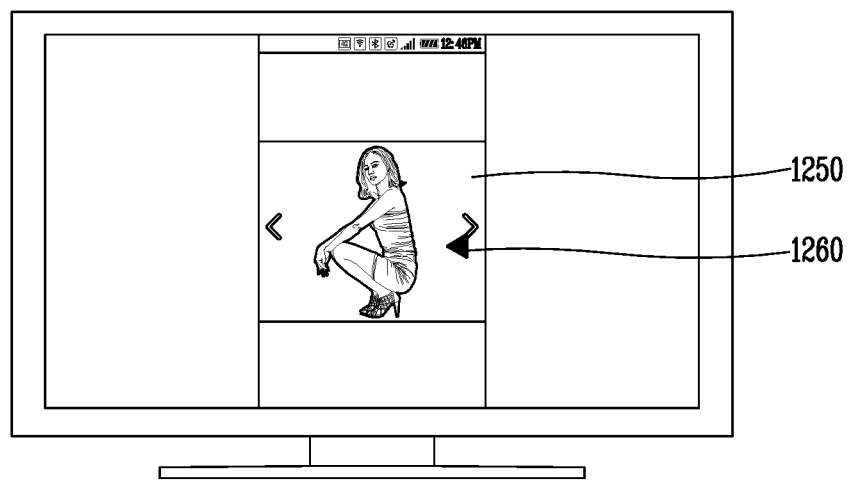

FIGS. 12A, 12B and 12C are conceptual views illustrating an embodiment in which a pointer is displayed during screen mirroring.

Referring to FIG. 12A, a home screen image 1210 being displayed on a mobile terminal may be displayed on the display unit 140. Here, a pointer may be displayed on an icon 1220 of an application preset by a user.

For another embodiment, a pointer may be displayed on an icon of an application that has been frequently executed by a user based on use history information.

Referring to FIG. 12B, a view screen 1230 being displayed on a mobile terminal may be displayed on the display unit 140. Here, a pointer may be displayed on a playback bar 1240 capable of controlling a playback state of the video.

Referring to FIG. 12C, an execution screen 1250 of a photo album application being displayed on a mobile terminal may be displayed on the display unit 140. Here, a pointer may be displayed on an icon for searching a picture. Specifically, a pointer may be displayed on an icon 1260 for turning over to a next image.

On the other hand, during the display of a pointer, a preset object may be displayed in a region adjacent to the pointer. Specifically, a preset object may be a layer or icon including specific information.

Figure 13A:
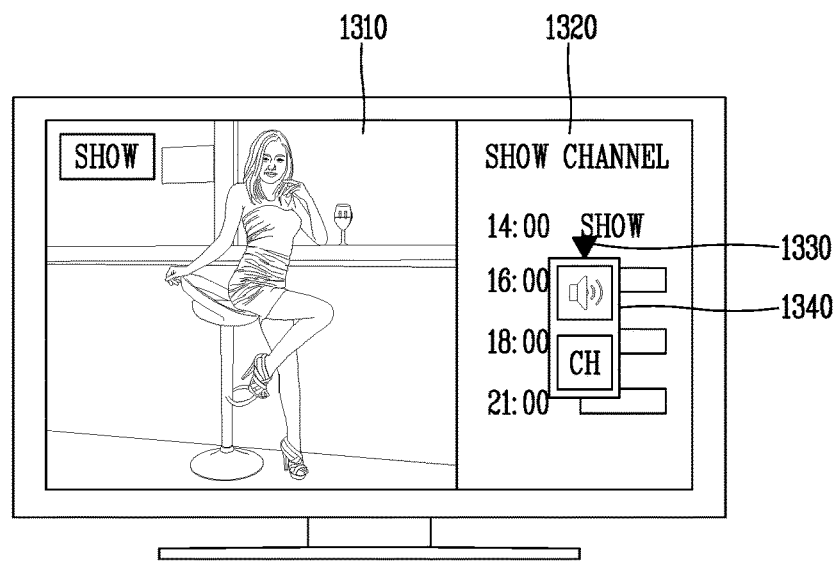
FIGS. 13A, 13B and 13C are conceptual views illustrating an embodiment in which an object is displayed in a region adjacent to a pointer.
Figure 13B:
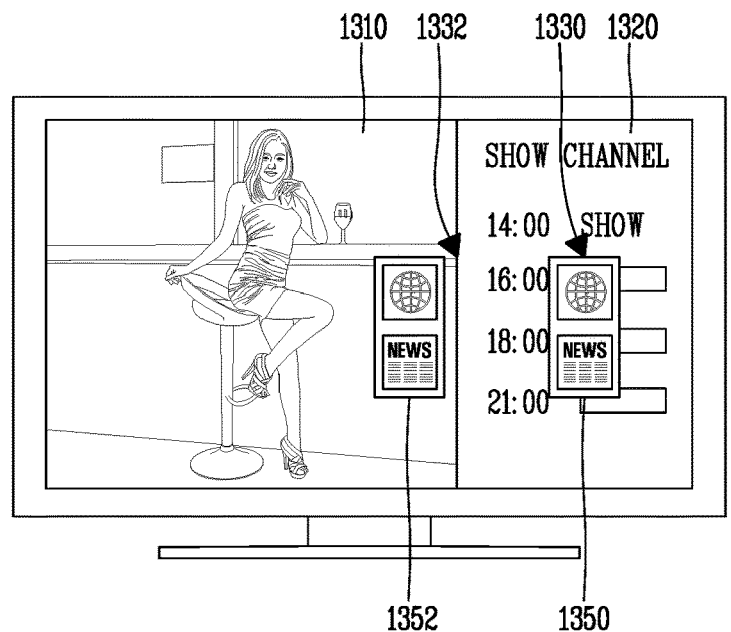
Figure 13C:
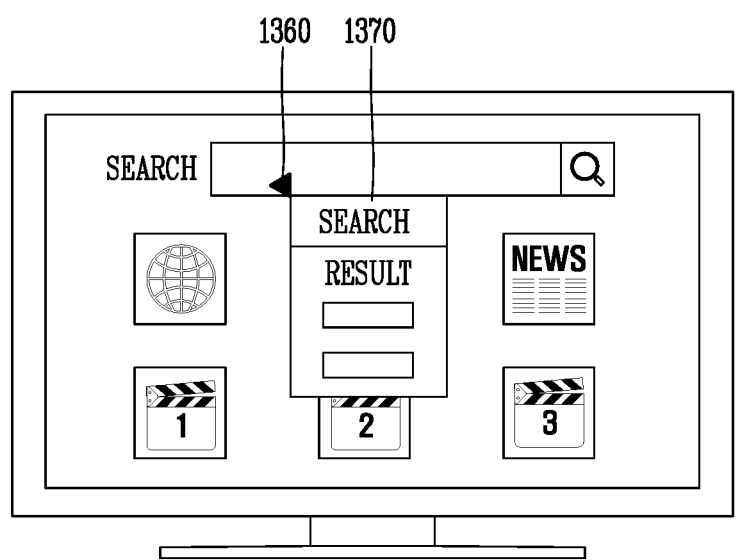

FIGS. 13A, 13B and 13C are conceptual views illustrating an embodiment in which an object is displayed in a region adjacent to a pointer.

Referring to FIG. 13A, a channel image 1310 currently being broadcasted and a first layer 1320, which is an upper layer of the channel image 1310 containing channel information, may be displayed. Here, a pointer may be displayed at a center position 1330 of the first layer 1320, and a second layer 1340, which is an upper layer of the first layer, may be displayed in a region adjacent to the pointer. Here, information such as a TV volume control, a channel setting, a remote controller UI, a numerical key, and the like may be displayed.

For another embodiment, referring to FIG. 13B, a pointer may be displayed at a center position 1330 of the first layer 1320, and a third layer 1350, which is an upper layer of the first layer, may be displayed in a region adjacent to the pointer. Here, information such as an application, a channel, a function, and the like that are set or frequently used by a user may be displayed on the third layer 1350.

For still another embodiment, a pointer may be displayed in an edge region 1332 of the first layer 1320, and a fourth layer 1352 may be displayed in a region 1352 adjacent to the pointer that does not hide the content of the first layer 1320.

For yet still another embodiment, referring to FIG. 13C, a pointer may be displayed on a web browser search window or Internet search window 1360, and an upper layer 1370 may be displayed in a region adjacent to the pointer. Here, information such as previous input content, a previous search result, a search result for currently input content may be displayed on the upper layer 1370.

Figure 14:
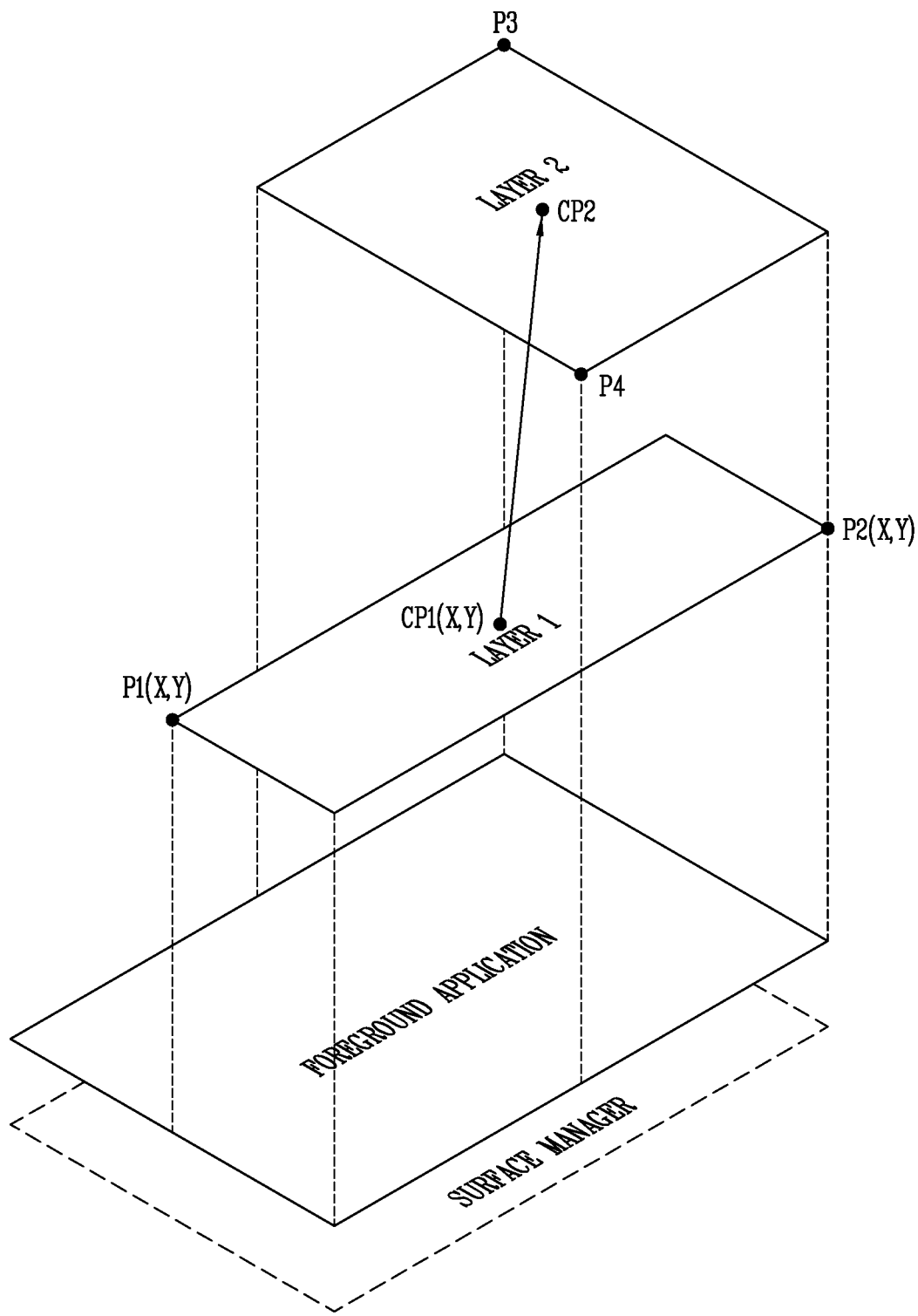
FIG. 14 is a conceptual view for explaining an embodiment of pointer movement in an image display device according to the present disclosure.

FIG. 14 is a conceptual view for explaining an embodiment of pointer movement in an image display device according to the present disclosure.

Referring to FIG. 14, a pop-up layer UI (Layer 1) may be generated on a foreground application. Here, the generated pop-up UI may transfer the location information of a layer required for cursor (pointer) generation or the location information of a cursor to be generated to a surface manager for managing UI layers. For an embodiment, a length, a width, a region coordinate (p1, p2), a title, an address, a center coordinate (cp1) of the region, and the like of the Layer 1 may be transferred. Accordingly, the surface manager may locate a cursor based on the transferred information.

Subsequently, a pop-up layer UI (Layer 2) may be generated on a foregoing application. Similarly, the generated pop-up layer UI may transfer the location information of a layer required for cursor generation or the location information of a cursor to be generated to the surface manager for managing UI layers. For an embodiment, a length, a width, a region coordinate (p3, p3), a title, an address, a center coordinate (cp2) of the region, and the like of the Layer 2 may be transferred. Accordingly, the surface manager may locate a cursor based on the transferred information.

For a specific embodiment, when the Layer 1 is displayed, a cursor may be located at a center coordinate (cp1) of the Layer 1. Subsequently, when the Layer 2 is displayed, a cursor being displayed at the center coordinate (cp1) of the Layer 1 may be moved to a center coordinate (cp2) of the Layer 2. Otherwise, a cursor may be activated at the center coordinate (cp2) of the Layer 2.

For another embodiment, the generated UI may transfer a center coordinate of an object having a default focus among objects contained in itself. Accordingly, the surface manager may move the location of a cursor to the transferred coordinate or activate a cursor at the relevant location.

For still another embodiment, a pattern of a cursor moved by a user may be memorized to automatically move the cursor arrived at a specific point to another point.

For yet still another embodiment, a cursor may be located at the center of a temporally later generated UI with respect to a plurality of UI layers (post-generation module priority) or a cursor may be located at a center coordinate of the center coordinates of the plurality of UI layers.

On the other hand, the location of a cursor may be set according to the information of an application being executed. Hereinafter, a specific embodiment thereof will be described.

Specifically, a cursor may be located based on the window type information of an application being executed. For example, a cursor may be located according to whether the application is a full-screen application that fills the entire screen or a sub-window type that occupies a lower end or right side of the screen.

In other words, a cursor may be located based on a form (shape, size, etc.) of a layer displayed with an application in a situation unable to receive specific related information such as a type, a title and the like of the application.

For still yet another embodiment, the position information of an application may be received to locate a cursor. Specifically, a platform may receive the information of a region occupied by itself from an application being executed on a foreground to locate a cursor at the center pointer of the received region.

Here, a method of allowing an application to directly call a specific API or update a DB, a passive method of allowing a platform to access a location of the relevant information, and the like are allowed for an information transfer method.

For yet still another embodiment, a platform may manage the information of an application as a DB and directly locate it. In other words, a platform may know a window region or type in advance for a specific application or in-house developed application or the like, thereby making the information as a database to use it.

On the other hand, when a mirroring screen is displayed as a PIP, a cursor may be located at the center of a control region using a communication status of WiFi Direct and a PIP region coordinate.

For an embodiment, when mirroring is being carried out, a cursor may be located on a window region occupied by the mirroring.

For another embodiment, when an object having a main focus on a key at a time point is unique, a cursor may be located at the center of a window region occupied by an application having the main focus. Specifically, when a floating type application is being carried out, only the floating type application may have a focus on the key.

For still another embodiment, when there is a specific control UI for the purpose of an operation linked to a TV, a focus may be located at a location capable of approaching the relevant UI in the fastest way.

For yet still another embodiment, when the transmission of a protocol containing a mirroring terminal and specific information is allowed, a cursor may be located according to a pattern or application type specified by a user.

The effects of an image display device and a control method thereof according to the present disclosure will be described as follows.

According to at least one of the embodiments of the present disclosure, there is an advantage capable of setting a position of a pointer in consideration of a newly displayed layer.

Furthermore, according to at least one of the embodiments of the present disclosure, there is an advantage capable of a display position of a pointer in consideration of a user's history.

As a result, it may be possible to enhance a user's convenience.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. An image display device, comprising:
a display unit configured to display image information; and
a controller configured to:
display a first layer comprising a plurality of icons as an upper layer when the image information is displayed on the display unit in response to a request of a user,
display a pointer at a position corresponding to an icon among the plurality of icons based on history information,
wherein the pointer is displayed at the icon among the plurality of icons when the pointer has been set at the position corresponding to the icon above a preset number of times by a user input on the first layer displayed as the upper layer,
display a plurality of channel lists and the pointer when the user applies a flicking gesture using a remote controller,
wherein at least one of a shape, size and color of the pointer is displayed differently according to a speed or level of the flicking gesture, and
wherein the controller displays the pointer in a region displayed with a preset object in response to the image information being displayed on the display unit based on the first layer displayed as the upper layer.

2. The image display device of claim 1, wherein the controller displays the pointer at a preset point of the region displayed with the first layer based on the first layer displayed as the upper layer.

3. The image display device of claim 2, wherein the controller displays the pointer at a center point of the region displayed with the first layer.

4. The image display device of claim 1, wherein the controller displays the pointer on the first layer based on at least one information of a shape, a size and a displayed position of the first layer.

5. The image display device of claim 4, wherein the controller displays the pointer on the first layer based on at least one coordinate contained in the first layer.

6. The image display device of claim 1, wherein the controller displays the pointer in a region displayed with a preset layer among a plurality of layers based on the plurality of layers concurrently or sequentially displayed in a state that the image information is displayed on the display unit.

7. The image display device of claim 6, wherein the controller displays the pointer in a region displayed with a topmost layer among the plurality of layers.

8. The image display device of claim 1, wherein the controller displays the pointer in a region displayed with a preset content among a plurality of contents based on the plurality of contents displayed on the display unit.

9. The image display device of claim 8, wherein the controller displays the pointer in a region allowed for a user input.

10. The image display device of claim 9, wherein the controller displays the pointer on a pause or stop icon for a video content when the video content is being played back, and displays the pointer on a playback icon for the video content when the video content is in a pause or stop state.

11. The image display device of claim 1, wherein the controller displays the pointer on a layer on which an object for controlling the image information being displayed is displayed based on the image information being displayed on an external terminal that is displayed on the display unit.

12. The image display device of claim 1, wherein the controller displays the pointer on a lastly displayed layer of a plurality of layers based on the plurality of layers being sequentially displayed.

13. A control method of an image display device, the method comprising:
displaying image information on a display unit;
displaying a first layer comprising a plurality of icons as an upper layer when the image information is displayed on the display unit in response to a request of a user;
displaying a pointer at a position corresponding to an icon among the plurality of icons based on history information, wherein the pointer is displayed at the icon among the plurality of icons when the pointer has been set at the position corresponding to the icon above a preset number of times by a user input on the first layer displayed as the upper layer;
displaying a plurality of channel lists and the pointer when the user applies a flicking gesture using a remote controller,
wherein at least one of a shape, size and color of the pointer is displayed differently according to a speed or level of the flicking gesture, and
displaying the pointer in a region displayed with a preset object in response to the image information being displayed on the display unit based on the first layer displayed as the upper layer.

* * * * *